US010194261B2

United States Patent
Dong et al.

(10) Patent No.: US 10,194,261 B2
(45) Date of Patent: Jan. 29, 2019

(54) METHOD AND APPARATUS TO SUPPORT M2M CONTENT AND CONTEXT BASED SERVICES

(71) Applicant: IoT Holdings, Inc., Wilmington, DE (US)

(72) Inventors: Lijun Dong, San Diego, CA (US); Dale N. Seed, Allentown, PA (US); Paul L. Russell, Jr., Pennington, NJ (US); Chonggang Wang, Princeton, NJ (US); Zongrui Ding, Portland, OR (US); Guang Lu, Thornhill (CA); Mohsen Akbari, Montreal (CA)

(73) Assignee: IOT Holdings, Inc., Wilmington, DE (US)

( * ) Notice: Subject to any disclaimer, the term of this patent is extended or adjusted under 35 U.S.C. 154(b) by 0 days.

(21) Appl. No.: 15/893,942

(22) Filed: Feb. 12, 2018

(65) Prior Publication Data

US 2018/0167761 A1    Jun. 14, 2018

Related U.S. Application Data

(63) Continuation of application No. 13/757,331, filed on Feb. 1, 2013, now Pat. No. 9,894,457.

(Continued)

(51) Int. Cl.
*H04W 4/00* (2018.01)
*H04W 4/70* (2018.01)

(52) U.S. Cl.
CPC .............. *H04W 4/00* (2013.01); *H04W 4/70* (2018.02)

(58) Field of Classification Search
CPC ................................. H04W 4/00; H04W 4/70
See application file for complete search history.

(56) References Cited

U.S. PATENT DOCUMENTS

| 9,894,457 B2 * | 2/2018 | Dong ................. H04W 4/00 |
| 2003/0110297 A1 * | 6/2003 | Tabatabai .......... G06F 17/30905 709/246 |

(Continued)

FOREIGN PATENT DOCUMENTS

| IN | 225370 | 2/2009 |
| WO | 2011/112683 | 9/2011 |
| WO | 2013/007314 | 1/2013 |

OTHER PUBLICATIONS

ETSI Standards Overview of ETSI M2M Architecture Presented by: Barbara Pareglio, Ericsson, https://docbox.etsi.org/workshop/2011/201110_m2mworkshop/02_m2m_standard/m2mwg2_architecture_pareglio.pdf.*

(Continued)

*Primary Examiner* — Brandon J Miller
(74) *Attorney, Agent, or Firm* — Volpe and Koenig, P.C.

(57) ABSTRACT

A machine-to-machine (M2M) gateway is configured with a service capability layer (SCL) and includes a storage unit, a network interface and a processor. The storage unit stores rules for allocating resources in a resource tree. The resources include a functions collection resource of function sub-resources, at least one of which represents a function that generates contextual cues from content and a corresponding semantic description. The processor also receives requests to create new function sub-resources in the collection and creates new function sub-resources in the resource tree in response to the requests. The processor receives other requests targeting the new function sub-resources. The processor generates high-level contextual information, using the new function, based on content data and the associated semantic description of the content data received in the other requests, and routes data in the M2M network based on the generated information.

20 Claims, 38 Drawing Sheets

Related U.S. Application Data

(60) Provisional application No. 61/594,629, filed on Feb. 3, 2012, provisional application No. 61/653,772, filed on May 31, 2012.

(56) References Cited

U.S. PATENT DOCUMENTS

| | | |
|---|---|---|
| 2004/0153547 A1 | 8/2004 | Trossen |
| 2008/0005147 A1 | 1/2008 | Khushraj et al. |
| 2009/0177777 A1* | 7/2009 | Behrendt .......... G06F 17/30734 709/226 |
| 2010/0251129 A1* | 9/2010 | Beringer ................. G06F 9/451 715/738 |
| 2012/0131168 A1 | 5/2012 | Foti |
| 2012/0166610 A1 | 6/2012 | Doh et al. |
| 2013/0152217 A1 | 6/2013 | Park |
| 2013/0212527 A1 | 8/2013 | Sublett |
| 2013/0272252 A1* | 10/2013 | Jain ....................... H04W 72/02 370/329 |
| 2013/0332627 A1 | 12/2013 | Skog et al. |
| 2014/0143383 A1* | 5/2014 | Skog ....................... H04W 4/70 709/217 |
| 2015/0012332 A1 | 1/2015 | Papachristos |
| 2015/0039635 A1* | 2/2015 | Monjas Llorente .. H04L 65/605 707/754 |

OTHER PUBLICATIONS

ETSI TS 102 689 V1.1.1 (Aug. 2010) Machine-to-Machine communications (M2M); M2M service requirements, http://www.etsi.org/deliver/etsi_ts/102600_102699/102689/01.01.01_60/ts_102689v010101p.pdf.*

ETSI TS 102 689 V1.1.1 (Oct. 2011) Machine-to-Machine communications (M2M); M2M Functional architecture, http://www.etsi.org/deliver/etsi_ts/102600_102699/102690/01.01.01_60/ts_102690v010101p.pdf.*

Bureau International Des Poids Et Mesures, "The International System of Units (SI)," $8^{th}$ edition (2006).

Chen et al., "A Survey of Context-Aware Mobile Computing Research," Dartmouth Computer Science Technical Report, TR2000-381 (2000).

Dey, "Understanding and Using Context," Personal and Ubiquitous Computing, 5(1):4-7 (2001).

Ericsson, "Use of XDMA for Resource Management in M2M," pp. 1-35 (Nov. 10, 2010).

European Telecommunications Standards Institute, "Machine to Machine Communications (M2M); Study on Sematic Support for M2M Data," Draft ETSI TR 101 584 V0.5.0 (Dec. 2012).

European Telecommunications Standards Institute, "Machine to Machine Communications (M2M); Functional Architecture," ETSI TS 102 690 v1.1.1 (Oct. 2011).

European Telecommunications Standards Institute, "Machine to Machine Communications (M2M); Interworking between the M2M Architecture and M3M Area Network technologies," ETSI TR 102 966 V0.1.1 (Sep. 2011).

Freed et al., "Multipurpose Internet Mail Extensions (MIME) Part One: Format of Internet Message Bodies," Network Working Group, Request for Comments: 2045 (Nov. 1996).

Freed et al., "Multipurpose Internet Mail Extensions (MIME) Part Two: Media Types," Network Working Group, Request for Comments: 2046 (Nov. 1996).

Schilit et al., "Context-Aware Computing Applications," IEEE Workshop on Mobile Computing Systems and Applications, Santa Cruz, California, USA (Dec. 8-9, 1994).

Shelby et al., "Constrained Application Protocol (CoAP)," draft-ietf-core-coap-08, CoRE Working Group, Internet-Draft (Nov. 1, 2011).

Thompson et al., "Guide for the Use of the International System of Units (SI)," National Institute of Standards and Technology, Special Publication 811 (Mar. 2008).

* cited by examiner

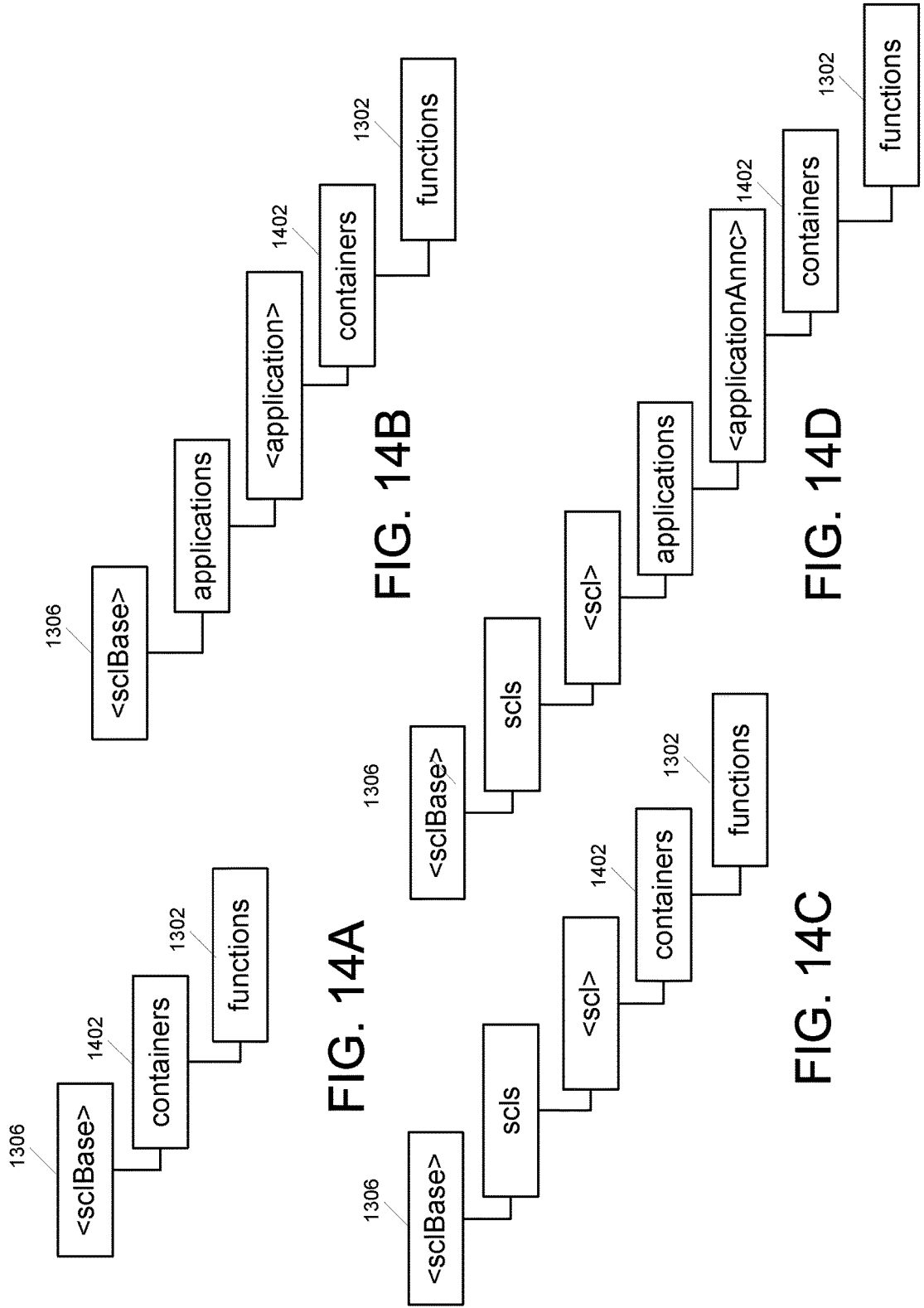

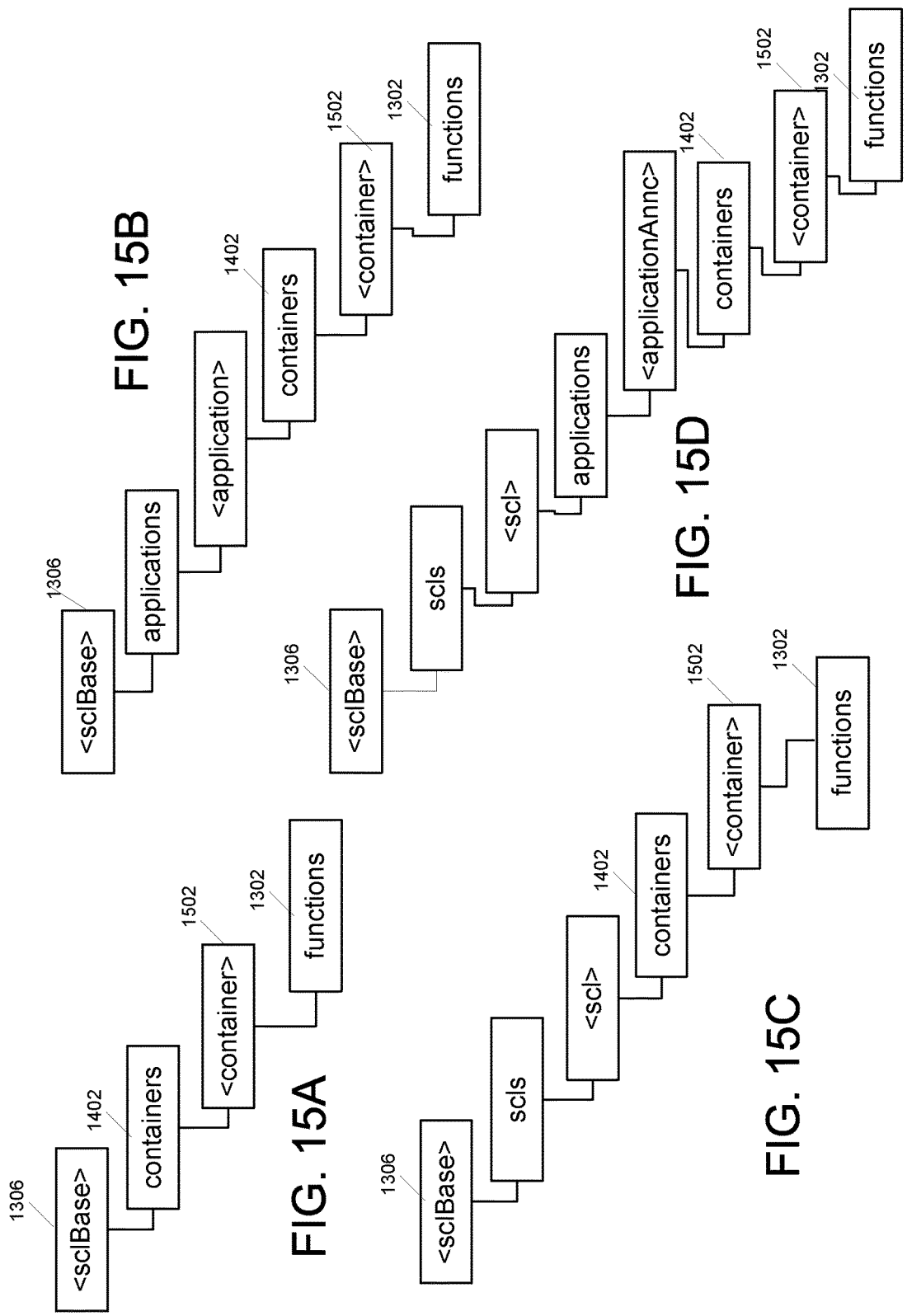

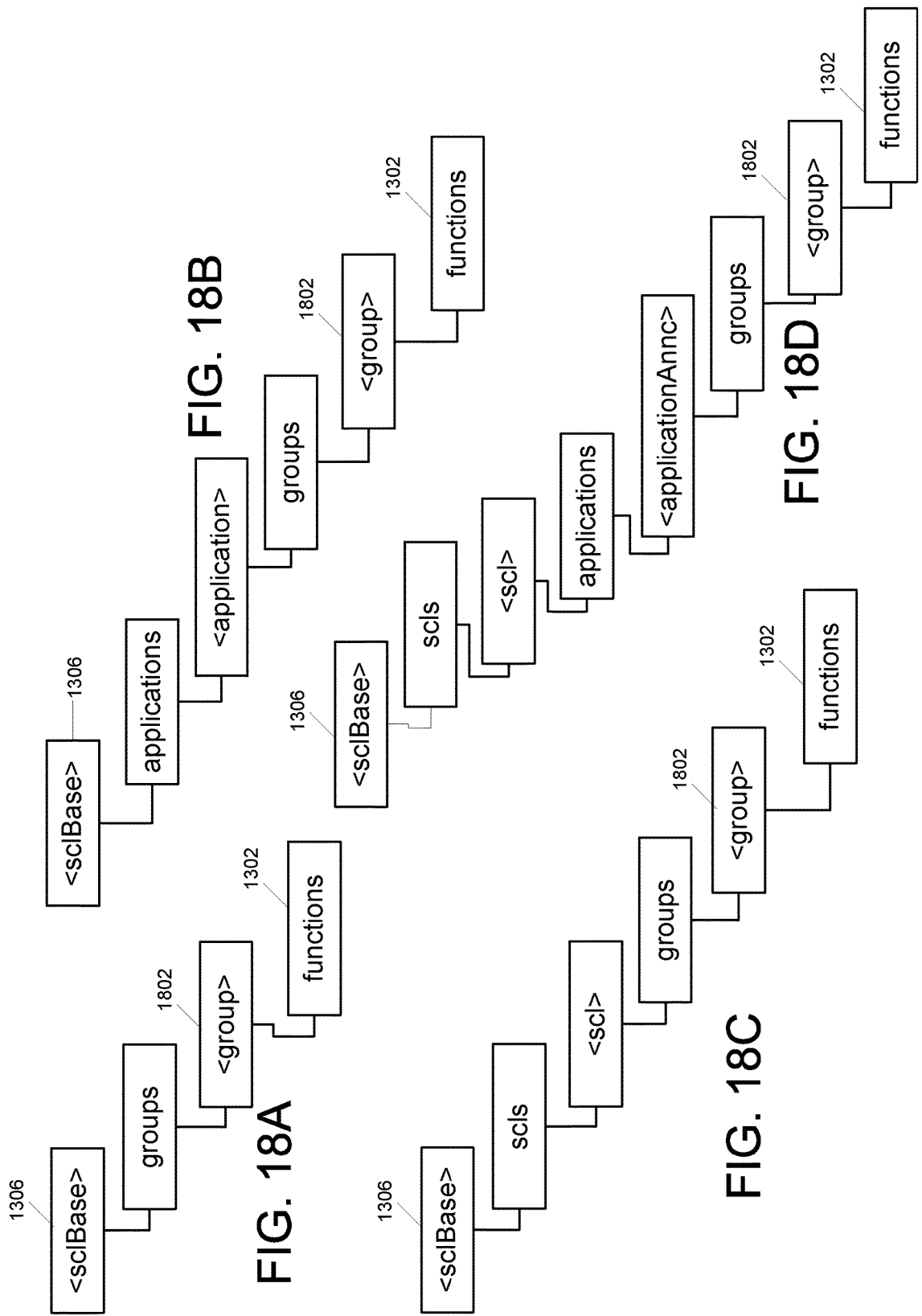

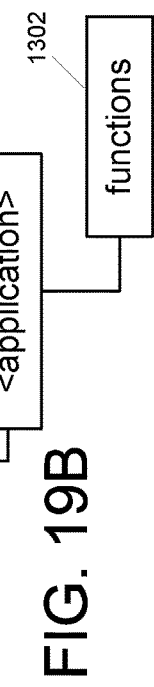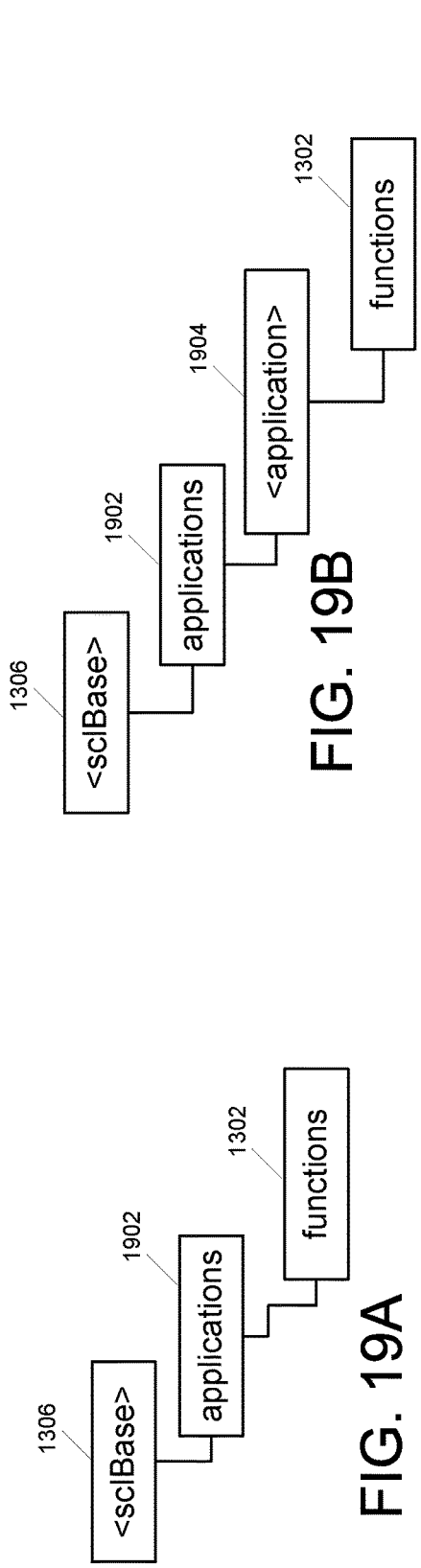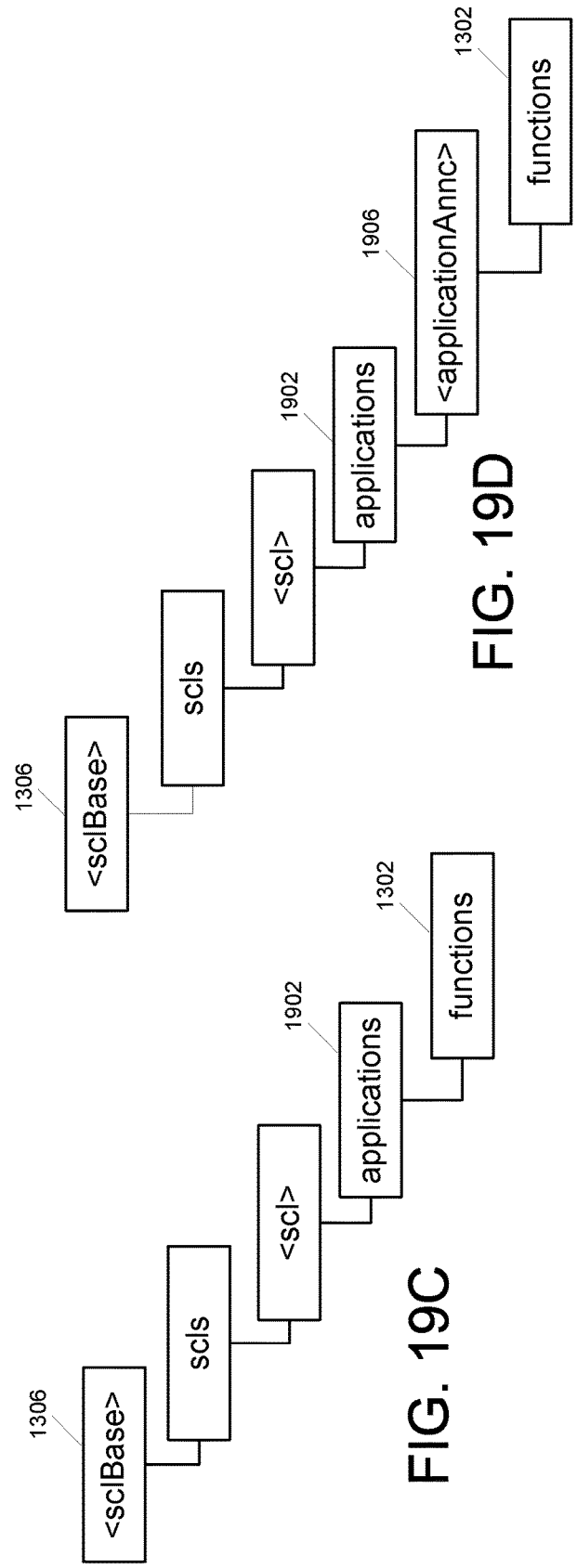

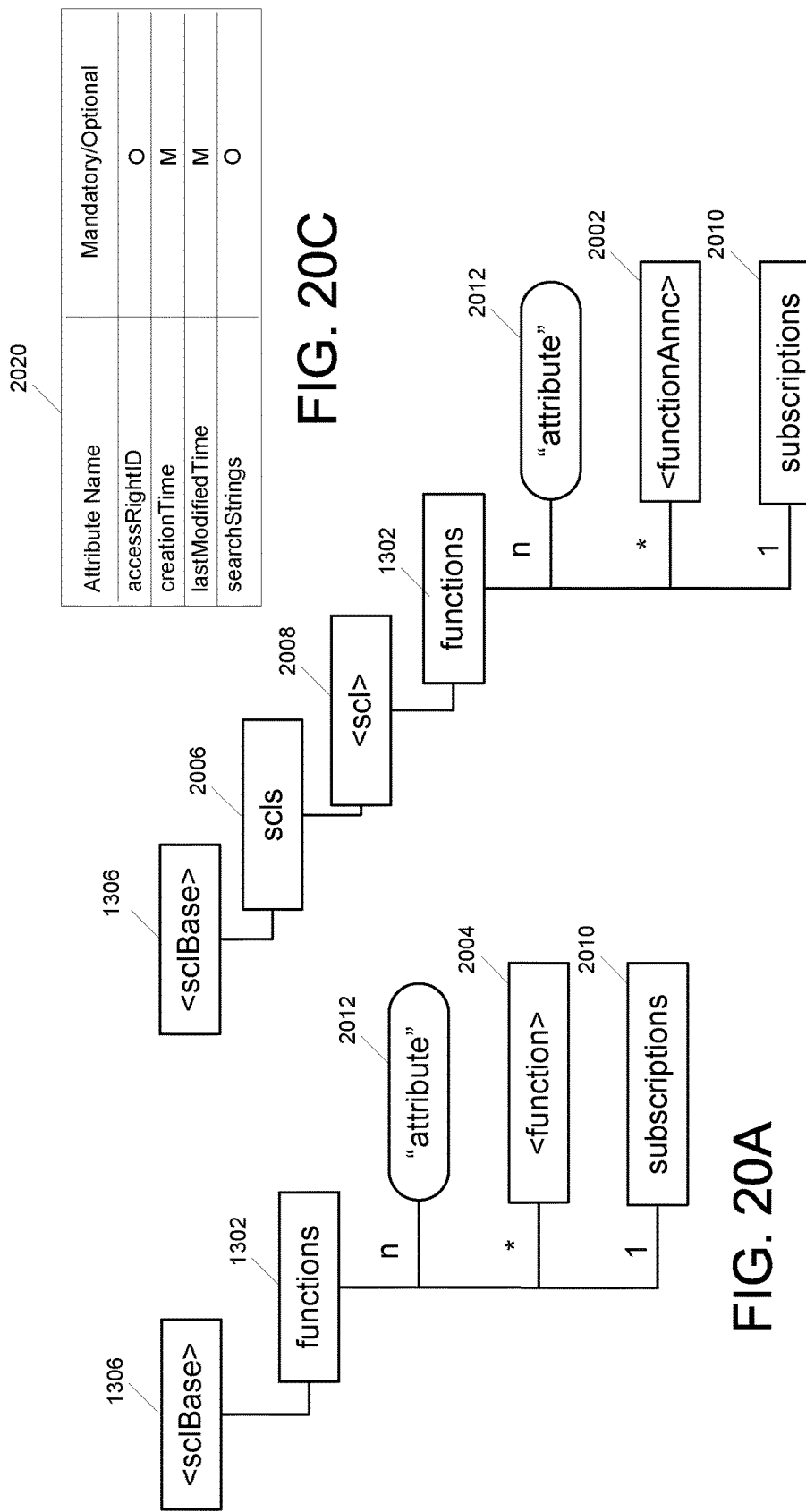

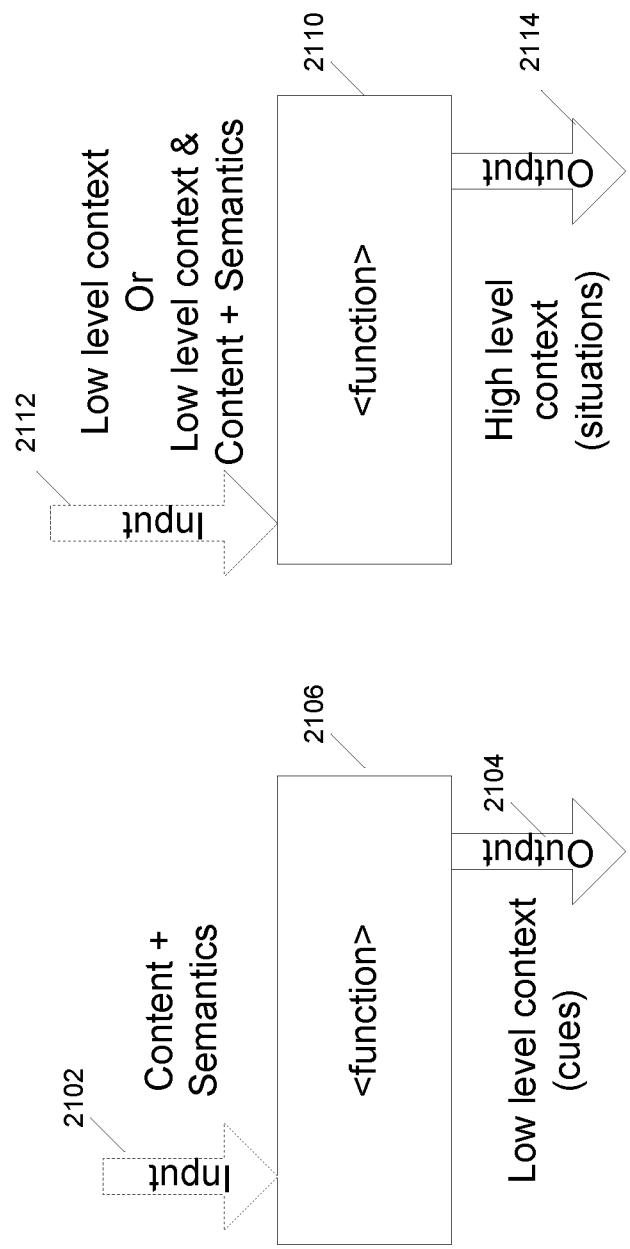

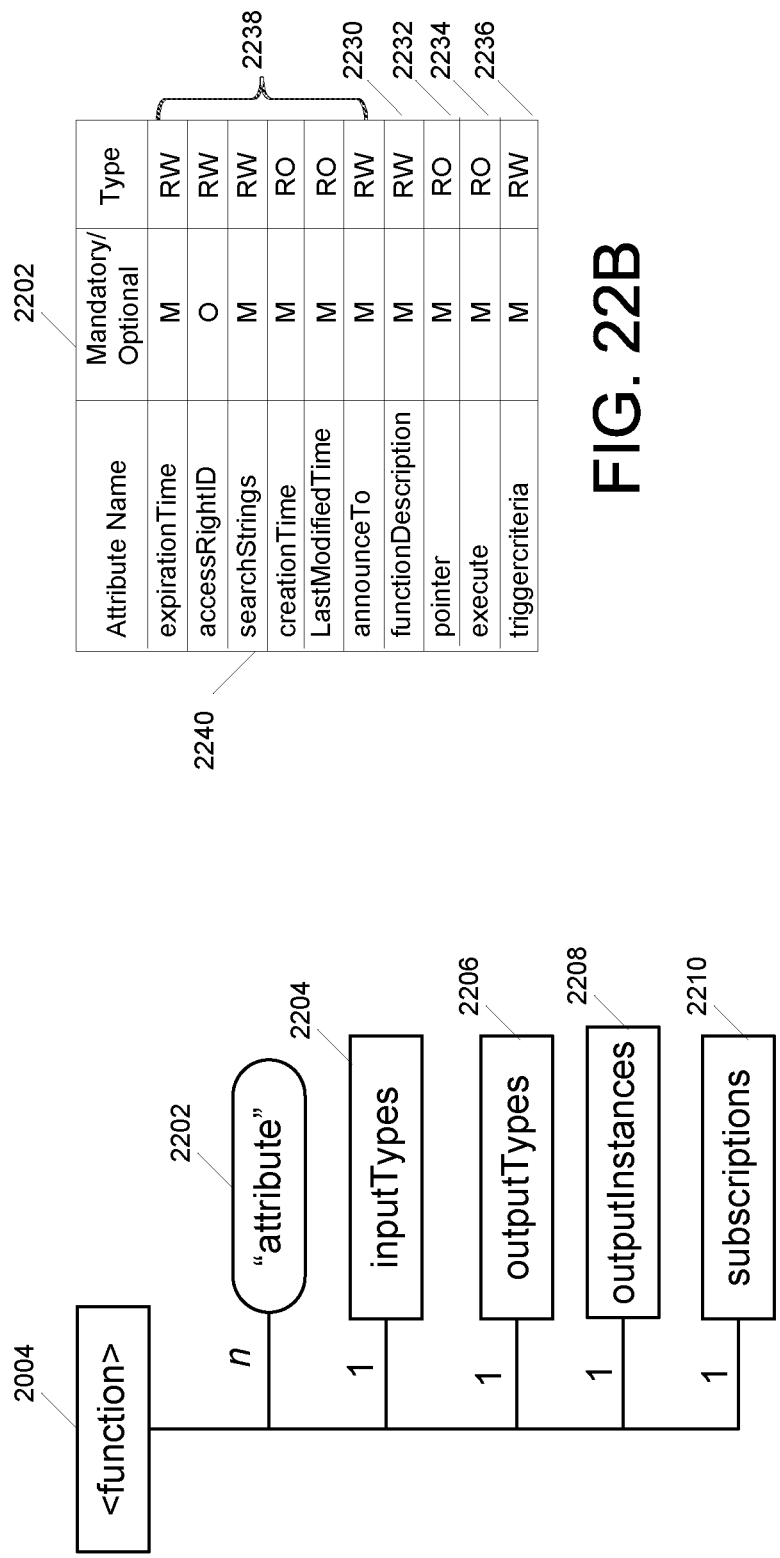

| Attribute Name | Mandatory/Optional | Type |
|---|---|---|
| accessRightID | O | RW |
| lastModifiedTime | M | RO |
| creationTime | M | RO |
| nrOfInputs | M | RW |

METHOD AND APPARATUS TO SUPPORT M2M CONTENT AND CONTEXT BASED SERVICES

CROSS REFERENCE TO RELATED APPLICATIONS

This application is a continuation of U.S. patent application Ser. No. 13/757,331, filed Feb. 1, 2013, which claims the benefit of U.S. Patent Application No. 61/594,629, filed on Feb. 3, 2012 and U.S. Patent Application No. 61/653,772, filed on May 31, 2012, the entire contents of which are hereby incorporated by reference herein.

BACKGROUND

Machine to machine (M2M) communications refers to communication between two machines. With more and more data being collected automatically from sensors and with machines becoming more and more intelligent, M2M is becoming more important.

Machines may communicate with one another via wireless or wired systems. Often, a machine such as a sensor or meter captures an event which generates data such as a temperature or an inventory level. The data may be communicated through a network to an application such as a software program that translates the data into meaningful information such as order items for restocking.

Often, these M2M services require many person years of software and hardware to accomplish.

SUMMARY

Therefore, there is a need in the art for device, computer readable media, and method for supporting services at an application service layer (ASL).

The method may include storing data and a content function interpreting the data to generate a semantic description of the data. The data may be stored with associated semantic information. The semantic information may be stored in a resource tree of the ASL. The method may include context aware functions processing the semantic description of the data to generate lower level contextual cues from the data. The method may include context aware reasoning functions processing the lower level contextual cues to deduce higher level context. The ASL may be a machine-to-machine (M2M) services capability layer (SCL).

A device for supporting services at a first application service layer (ASL) is disclosed. The device may include a storage configured to store data, and one or more processors configured to invoke a content function. The content function may be configured to interpret the data to generate a semantic description of the data.

BRIEF DESCRIPTION OF THE DRAWINGS

A more detailed understanding may be had from the following description, given by way of example in conjunction with the accompanying drawings wherein:

FIGS. 14A, 14B, 14C, 14D, 15A, 15B, 15C, 15D, 16A, 16B, 16C, 16D, 17A, 17B, 17C, 17D, 18A, 18B, 18C, 18D, 19A, 19B, 19C, and 19D illustrate structures for locating the functions collection according to some embodiments;

FIGS. 20A, 20B, and 20C illustrate sub-resources and attributes of functions collection;

FIGS. 21A and 21B illustrate instances of <function> resource;

FIGS. 22A and 22B illustrate a <function> resource including sub-resources and attributes according to some embodiments;

DETAILED DESCRIPTION

Figure 1A:
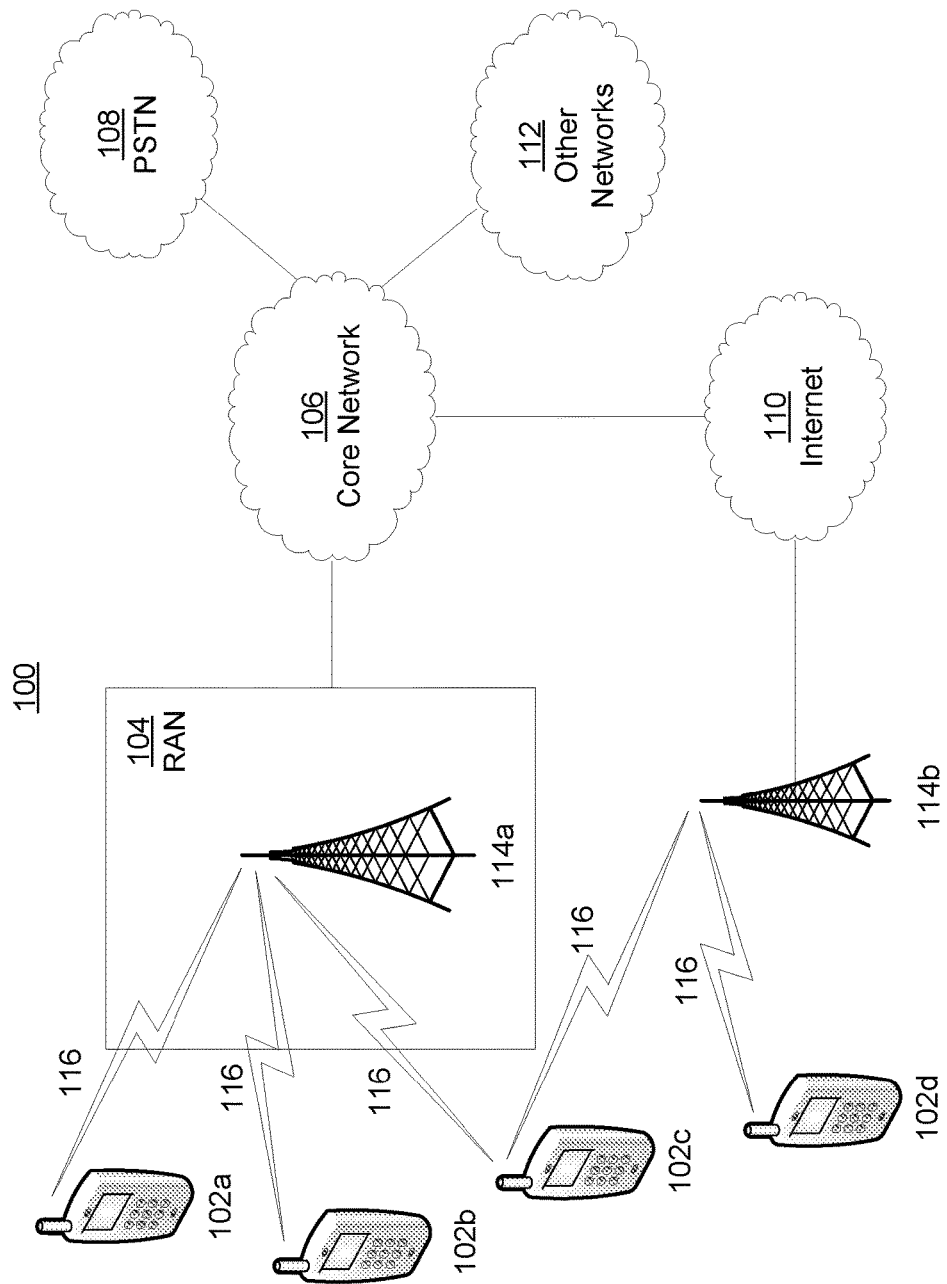
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include a user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode-B, a Home Node B, a Home eNode-B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as Institute of Electrical and Electronics Engineers (IEEE) 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode-B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communications networks owned and/or operated by other service providers. For example, the other networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
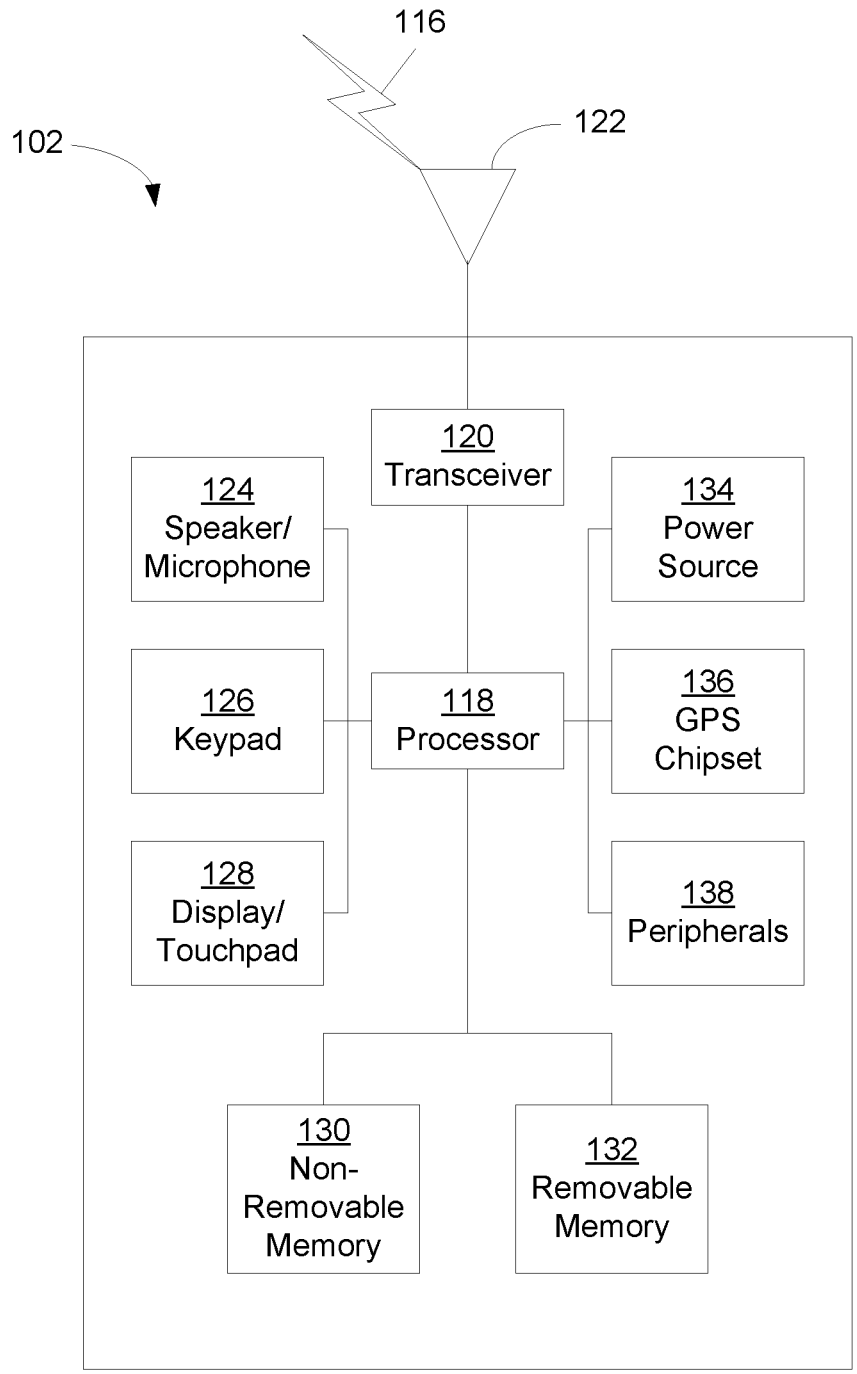
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
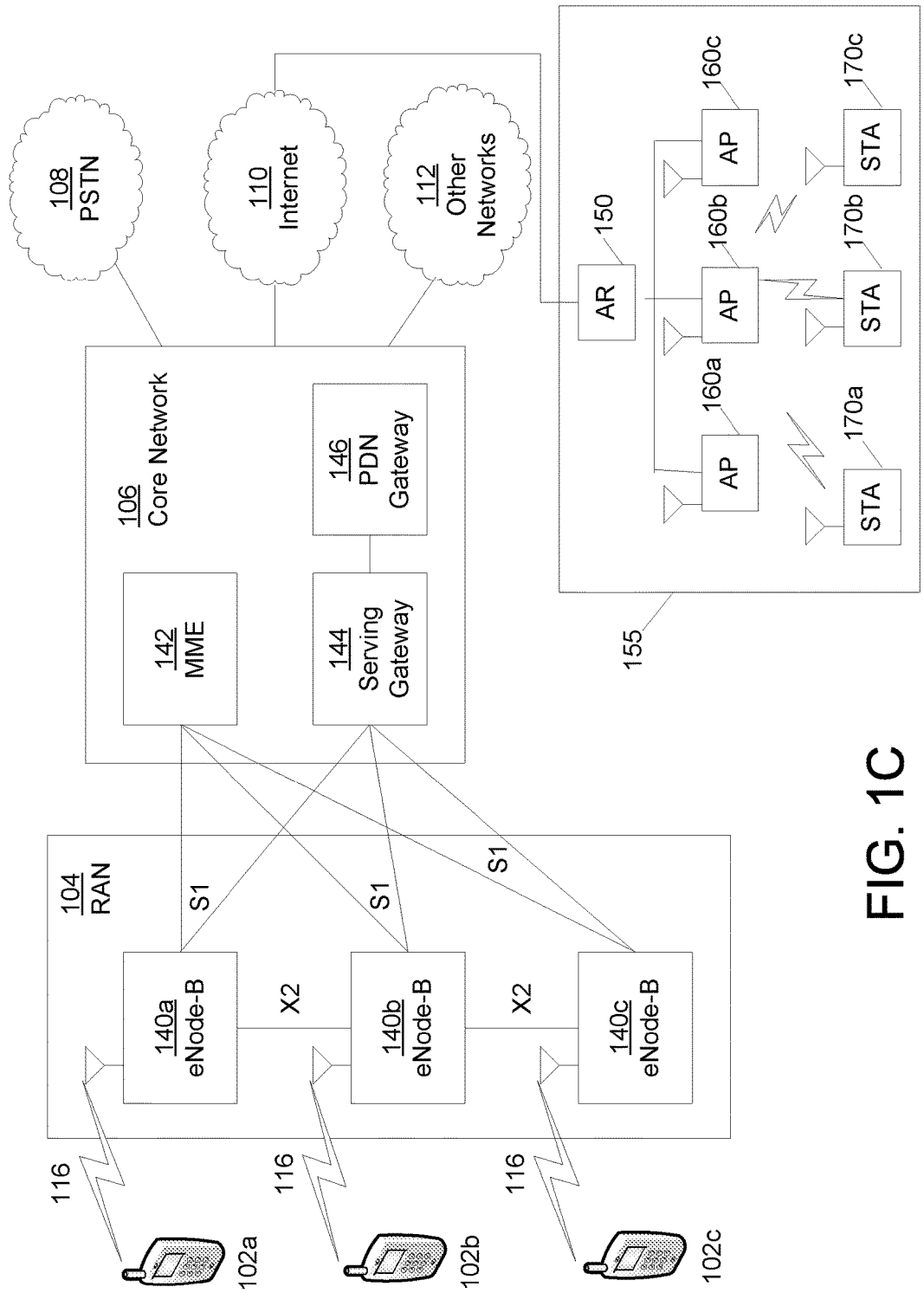
FIG. 1C is a system diagram of the RAN 104 and the core network 106 according to an embodiment.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c. A STA 170 may be a wireless device such as WTRU 102.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the other networks 112, which may include other wired or wireless networks that are owned and/or operated by other service providers.

In some embodiments, the WTRU 102 may be a device that generates data such as a water meter, inventor detector, door sense, temperature sensor, video camera, etc.

Figure 2:
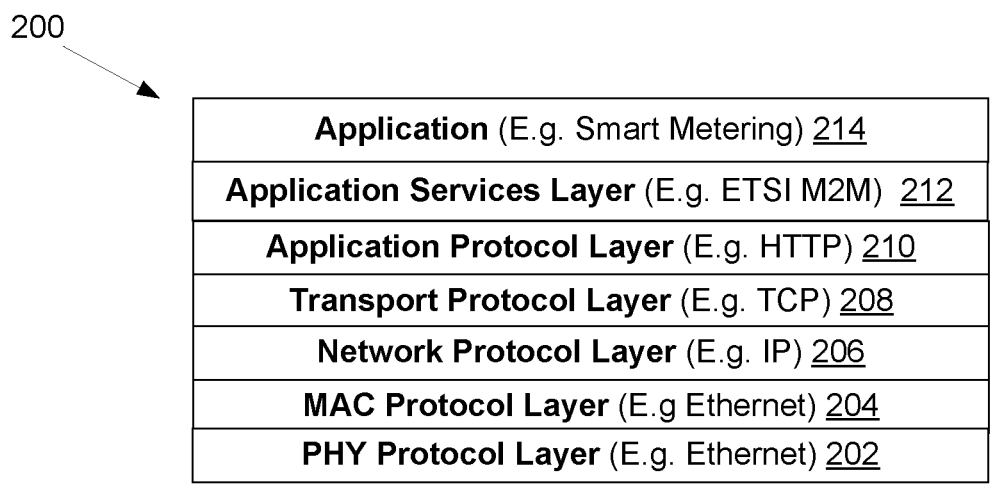
FIG. 2 illustrates a protocol stack including an application services layer (ASL)

FIG. 2 illustrates a protocol stack including an application services layer (ASL). Illustrated in FIG. 2 are a physical (PHY) protocol layer 202, a medium access control (MAC) protocol layer 204, a network protocol layer 206, a transport protocol layer 208, an application protocol layer 210, an ASL 212, and an application 214. An ASL 212 may provide a support layer for application 214 in which a collection of functions may be implemented in a re-usable and modular fashion. For example, an ASL 212 may support application programming interfaces (APIs) providing application 214 access to a collection or library of functions of an application protocol layer 210 as well as access to functions and services residing in lower protocol layers. An ASL 212 may, for examples, provide services such as application bootstrapping, registration, discovery, management, and general transmission and reception of application messages, or the like. The services of the ASL 212 may be made available to application 214 via APIs which may use defined message formats, resource structures and resource representation.

Figure 3:
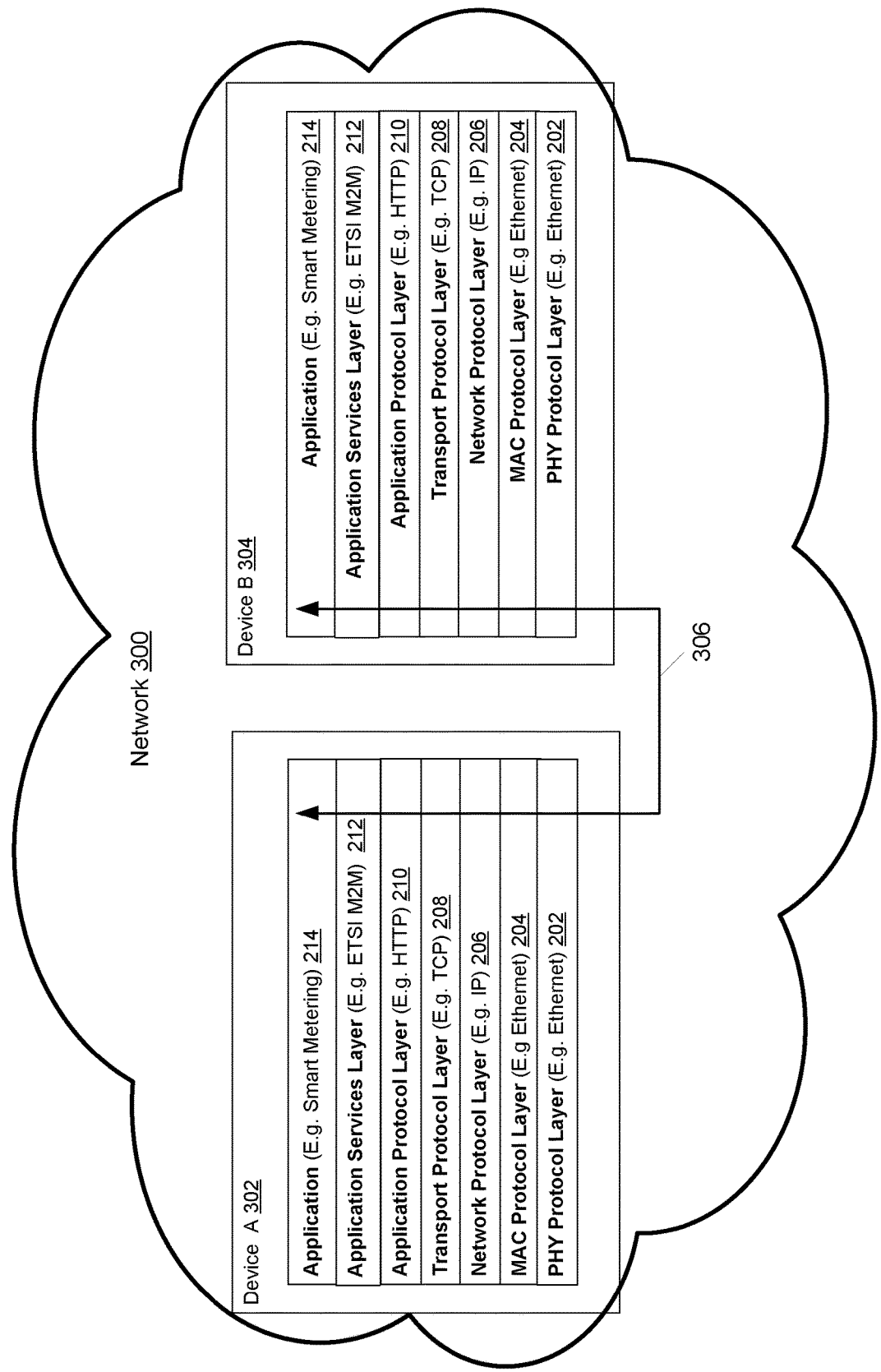
FIG. 3 illustrates an example where two applications communicate with one another via a common ASL.

FIG. 3 illustrates an example where two applications communicate with one another via a common ASL. Illustrated in FIG. 3 are network 300, device A 302, device B 304, and communications 306. Device A 302 and device B 304 may be wireless devices such as WTRUs 102, or devices that are wired directly to a communication network. Device A 302 and device B 304 may be termed machine to machine (M2M) devices 302, 304, as device A 302 and device B 304 are devices or machines that are communicating with one another. For example, device A 302 and device B 304 may be wired directly to the Internet 110 or other networks 112. Communication 306 may be a communication 306 between the application 214 of device A 302 and application 214 of Device B 304. The communication 306 illustrates application 214 of device A 302 and application 214 of device B 304 utilizing the ASL 212 to communicate with one another using protocols and services provided by the ASL 212.

Figure 4A:
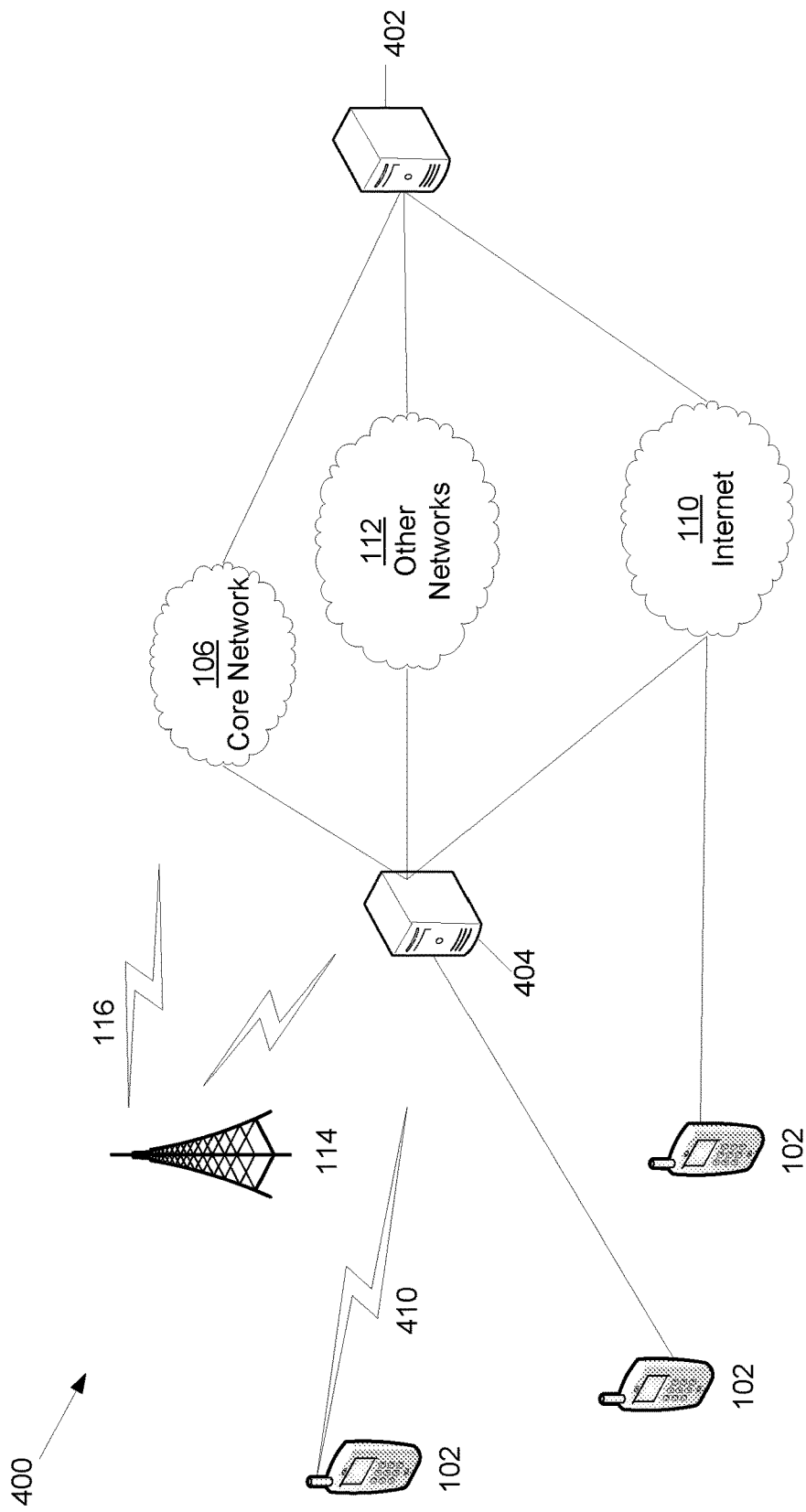
FIGS. 4A and 4B illustrate the M2M architecture according to some embodiments.

FIG. 4A illustrates an M2M architecture according to some embodiments. European Telecommunications Standards Institute (ETSI) Machine-to-Machine (M2M) communications functional architecture defines a standardized application service layer (ASL) specifically tailored for enabling communication between M2M applications and M2M devices, gateways, and servers. FIG. 4A illustrates the overall ETSI M2M architecture 400 consisting of M2M server 402, M2M gateway 404, M2M devices 102, and M2M applications (not illustrated). In ETSI M2M terminology, the ASL is referred to as the Service Capability Layer (SCL). M2M devices 102 may communicate with the server 402 via a WLAN 155, Bluetooth, 3GPP, etc. The M2M gateway 404 enables cellular and non-cellular M2M devices 102 to communication through operator networks, 106, 112, 110. The M2M server provides a service capability layer.

Figure 4B:
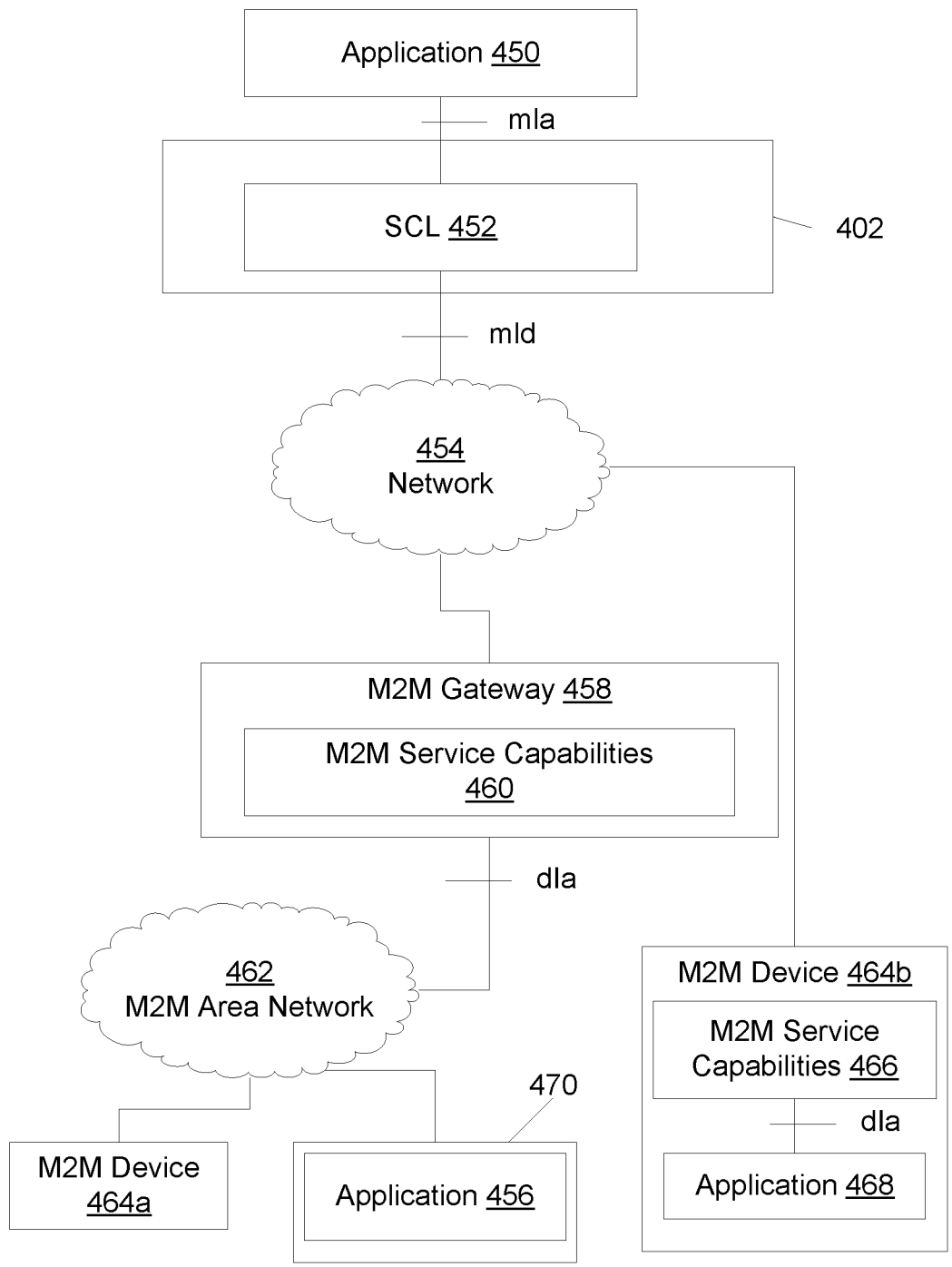

FIG. 4B illustrates an ETSI M2M architecture according to some embodiments. Illustrated in FIG. 4B are an application 450, an M2M server 402, a network 454, an M2M gateway 458, which includes M2M service capabilities 460, an M2M area Network 462, an M2M device 464a, an application 456, M2M device 464b, which includes M2M service capabilities 466, and an application 468. Illustrated are the interfaces dla, mld, and mla. In the ETSI M2M architecture, the SCL 452 can be hosted on a M2M Server 402, gateway 458, or device 464b. M2M applications 468, 450, 456 register and interface to one or more SCL 460, 452, 466 hosted on the M2M servers 402, gateways 458, or devices 464. The ETSI M2M SCL 452 defines the interfaces mIa, mId, dIa, which includes a RESTful resource structure and procedures used by both the M2M SCL as well as the applications 456, 468, 450 to communicate with one another. FIG. 4B illustrates that a M2M device 464a may not have a M2M service capabilities 466 in which case the M2M device 464a may communicate with a M2M gateway 458.

Figure 5:
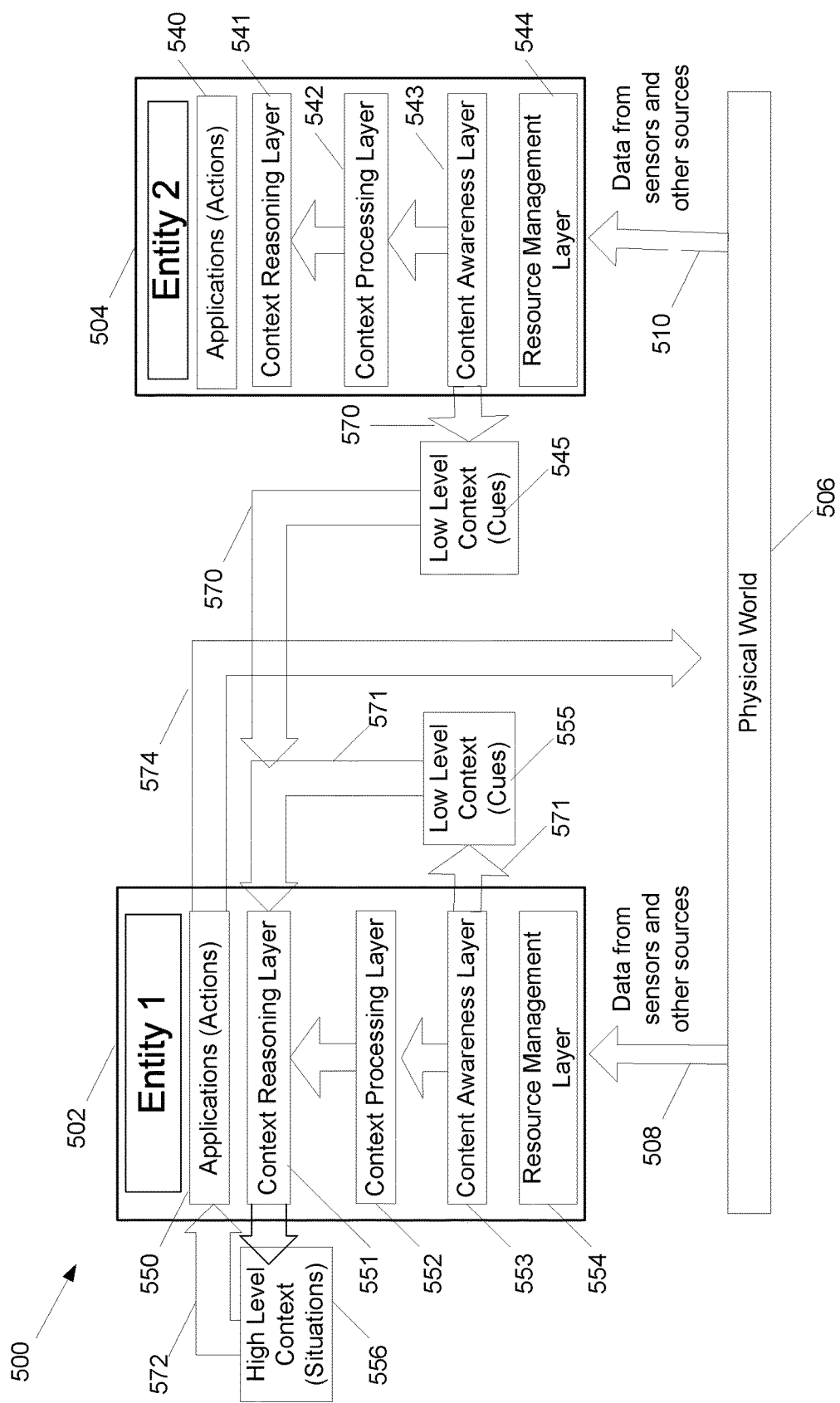
FIG. 5 illustrates an example of an M2M system according to some embodiments.

FIG. 5 illustrates an example of an M2M system according to some embodiments. Illustrated in FIG. 5 are entity 1 502, entity 2 504, and physical world 506. Data 508, 510, which may be content in entity 1 502, and entity 2 504, is collected from different sources such as sensors (not illustrated) in the physical world 506. The resource management layers 554, 544 store and manage the data 508, 510. The data 508, 510 may be stored as opaque content without data types describing the data 508, 510. The content awareness layer 543, 553 may interpret the opaque content. The output of the content awareness layer 543, 553 may be a semantic description of the content. The content aware layer 543, 553 may interpret the opaque content with one or more content functions. The content functions may use semantic information of the data 508, 510 to interpret the data 508, 510 to generate the semantic description of the data 508, 510. In some embodiments, the content functions may interpret the data 508, 510 to generate the semantic description of the data 508, 510 without using separately stored semantic information of the data 508, 510.

The context processing layer 542, 552 may process the semantic description of the content and abstract lower level contextual cues from the content. This may be done using context aware processing functions supported within the context processing layer 542, 552. These lower level contextual cues 545, 555 may then be processed by the context reasoning layer 541, 551 to further deduce higher level context called situational context 556. This may be done using context aware reasoning functions supported within the context reasoning layer 541, 551. Both the contextual cues 545, 555 and situational context 556 may then be made available at 572 to applications 540, 550 which can use the contextual cues 545, 555 and the situational context 556 to trigger certain actions. Based off of the contextual cues 545, 555 and the situational context 556, applications 540, 550 may then decide whether to take action 574 such as change the physical world 506. Together, the layers of the reference architecture form a consistent and continuous loop.

The context reasoning layer 541, 551 may also use semantic descriptions of the content 508, 510 from the content awareness layer 543, 553 in addition to contextual cues 545, 555. In addition, semantic descriptions of the content 508, 510, contextual cues 545, 555 and situational context 556 may also be shared across multiple entities 502, 504 such as ETSI M2M SCLs. Entity 1 502 and entity 2 504 may share content 508, 510, contextual cues 545, 555 and situational context 556. For example, the context reasoning layer 551 of entity 1 502 receives lower layer context cues 545 from the content awareness layer 553 at 571 and entity 2 504 at 570. Other interaction between entities 502, 504 is also possible such as the content awareness layer 543, 553 of one entity 502, 504 interacting with the content awareness layers 553, 543 of other entities 502, 504. The reference architecture for content and context aware services can also be applied to virtualized entities in the cloud.

Figure 6:
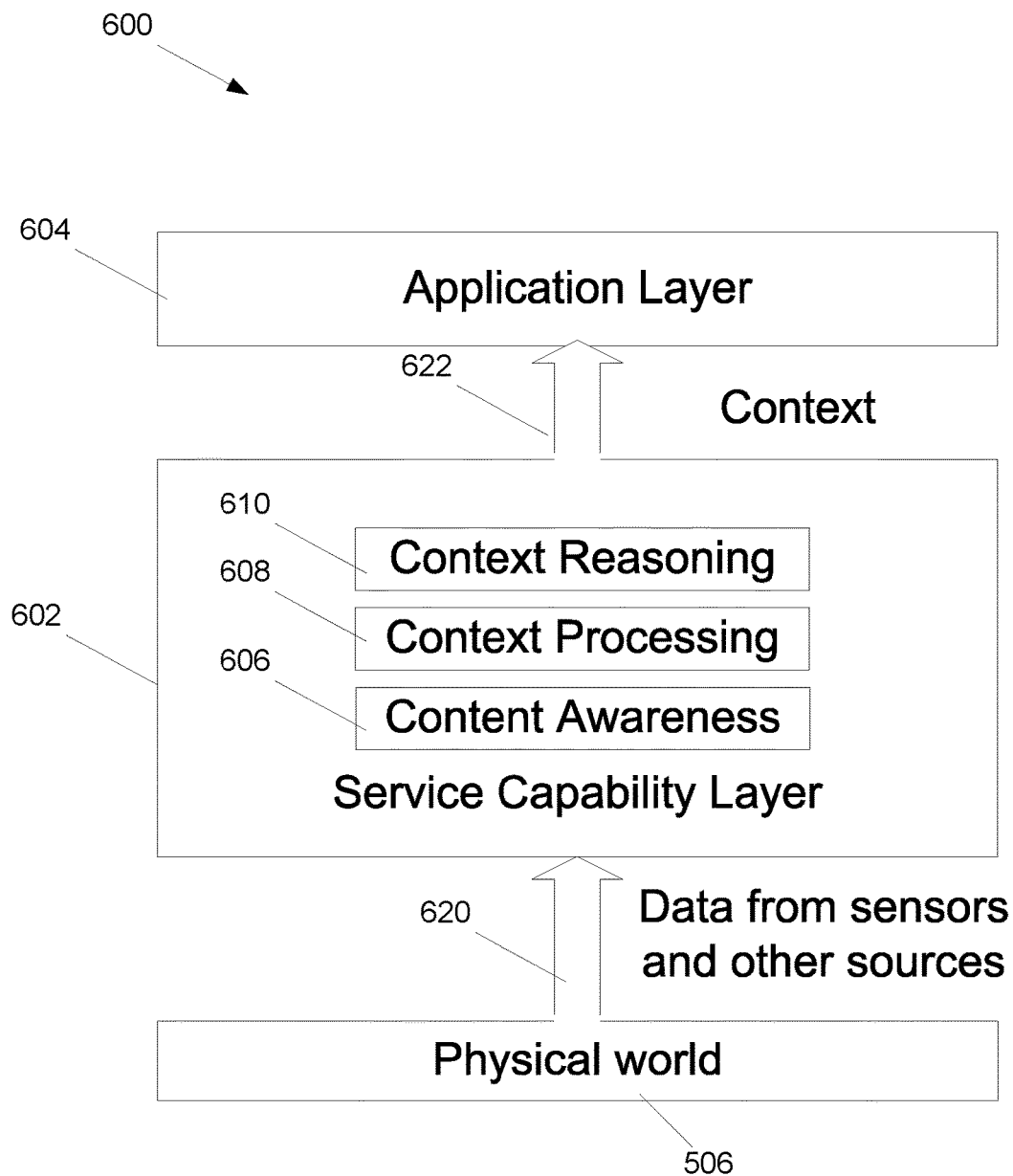
FIG. 6 illustrates an example of an M2M system according to some embodiments.

FIG. 6 illustrates an example of an M2M system according to some embodiments. The system 600 includes application layer 604, service capability layer 602, and physical world 506. The service capability layer 602 may include the functionality as described in the ETSI M2M architecture. The service capability layer 602 may include additional functionality provided by the content awareness 606, context processing 608, and the context reasoning 610.

Figure 7:
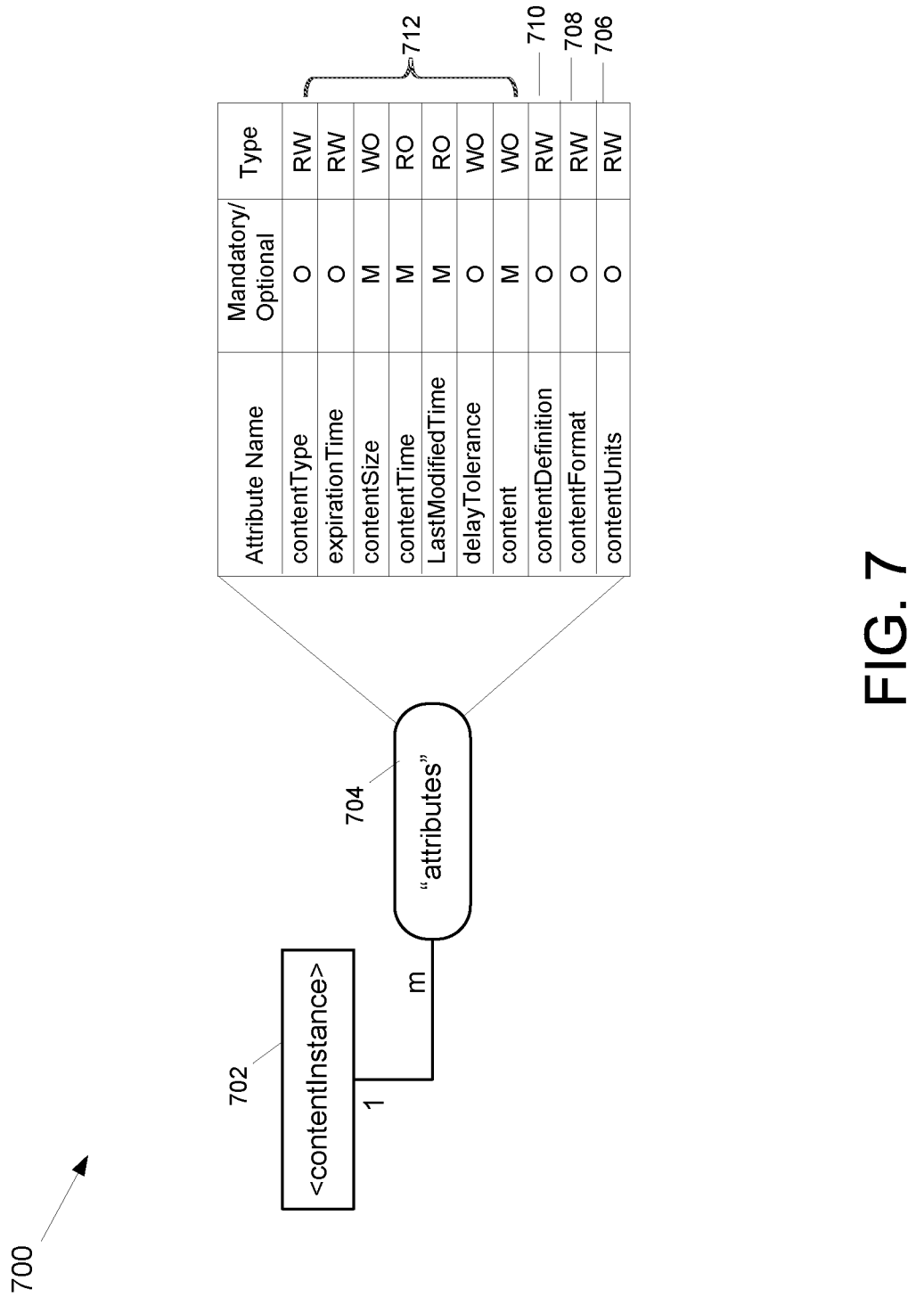
FIG. 7 illustrates content awareness for <contentInstance> with a set of attributes for a basic data type according to some embodiments.

FIG. 7 illustrates content awareness for <contentInstance> with a set of attributes for a basic data type according to some embodiments. Illustrated in FIG. 7 is <contentInstance> 702 and attributes 704. In some embodiments, the <contentInstance> 702 may be an ETSI M2M SCL content instance 702. For example, the <contentInstance> 702 may be a resource in which to store values of a temperature sensor. In some embodiments, the attributes 704 may be attributes 704 for content awareness for basic data types. For example, the attributes 704 may be for data that may be described as a single data element and of a single data type which may be supported by an ETSI M2M SCL. For example, attributes 704 may be a string, long, unsigned long, token, or other data type.

In some embodiments, some of the attributes 704 may be new attributes 706, 708, 710 and some of the attributes 704 may be existing attributes 712, which are part of the ETSI M2M SCL specification. For example, the attributes contentDefinition 710, contentFormat 708, contentUnits 706 are new attributes, and attributes 712 are part of the ETSI M2M SCL specification. In some embodiments, attributes 712 are optional. In some embodiments, different attributes 712 may be used with a different ASL 212.

Descriptions of the attributes contentDefinition 710, contentFormat 708, contentUnits 706 are provided in the Table 1 below. In some embodiments, the attributes 712 of ETSI M2M SCL do not need to be changed to support the new attributes 706, 708, 710. The new attributes 706, 708, 710, enable an SCL or application to detect when a resource <contentInstance> 702 contains content based on a basic data type. ContentDefininton 710 may be the definition of the basic data type. ContentFormat 708 may be the format of the basic data. ContentUnits 706 may be the units of the basic data type. The new attributes 706, 708, 710 enable an application or SCL to provide content-based services. In some embodiments, the content-based services are value-added services provided by an application or SCL.

TABLE 1

| Attribute Name | Type | Description |
| --- | --- | --- |
| contentDefinition | RW | In some embodiments, contentDefinition may include:<br>    OPAQUE (Default)<br>    STRING<br>    NUMERIC<br>    TOKEN<br>    etc.<br>In some embodiments, SCL may limit non-OPAQUE values to a limited set of contentTypes (e.g., application/octet-stream, text/plain, etc.). For unsupported contentTypes, this attribute may be hardcoded to OPAQUE by the SCL. |
| contentFormat | RW | When contentDefinition is non-OPAQUE, this attribute can be used to specify the format of the content. If contentDefinition is 'OPAQUE' this attribute may be Read Only and set to 'OPAQUE' by the SCL.<br>For example, if contentDefinition is equal to NUMERIC the following may be forms of the contentFormat used to define the format of the numeric data. In a similar fashion, other data types may be defined in contentDefinition and the format could be defined in contentFormat. For example, a STRING may have a contentFormat that specifies the fields and a delimiter for a STRING).<br>In some embodiments, NUMERIC may include:<br>    OPAQUE (Default)<br>    (M, N, T)<br>(M, N, T) may be a triplet: M = total # of bits, N = # of integer bits, (M-N-T, where T = 0 for unsigned & 1 for signed) = # of fractional bits, T = 's' (signed) or 'u' (unsigned).<br>For example, using (16, 4, u) = 16 total bits, 4 integer bits, & 12 fractional bits. Max value = 1111\_111111111111 = 15.999756 with a resolution of 0.000244141<br>For example, similarly (16, 4, s) = 16 total bits, 4 integer bits, & 11 fractional bits. Min value = 1\_0000\_00000000001 = −15.999512 with a resolution of 0.000488281<br>In some embodiments, NUMERIC may include:<br>Allowed values:<br>    OPAQUE (Default)<br>    SHORT    // signed 16-bit integer<br>    U\_SHORT    // unsigned 16-bit integer<br>    INT    // signed 32-bit integer<br>    U\_INT    // unsigned 32-bit integer<br>    LONG    // signed 64-bit integer<br>    U\_LONG    // unsigned 64-bit integer<br>    FLOAT    // single precision floating point<br>    DOUBLE    // double precision floating point<br>    LONG DOUBLE    // Extended precision floating point<br>In some embodiments, the formats can be based on the IEEE 754 standard. |
| contentUnits | RW | ContentUnits may defines the units of the content. Example units include, meter, kilogram, second, Celsius, watt, etc.<br>In some embodiments, contentUnits may not be applicable to a contentDefefinition. In some embodiments, if contentUnits is not applicable to a contentDefinition then contentUnits may be set to read only, and may in some embodiments be set to 'OPAQUE' by the SCL. |

Figure 8:
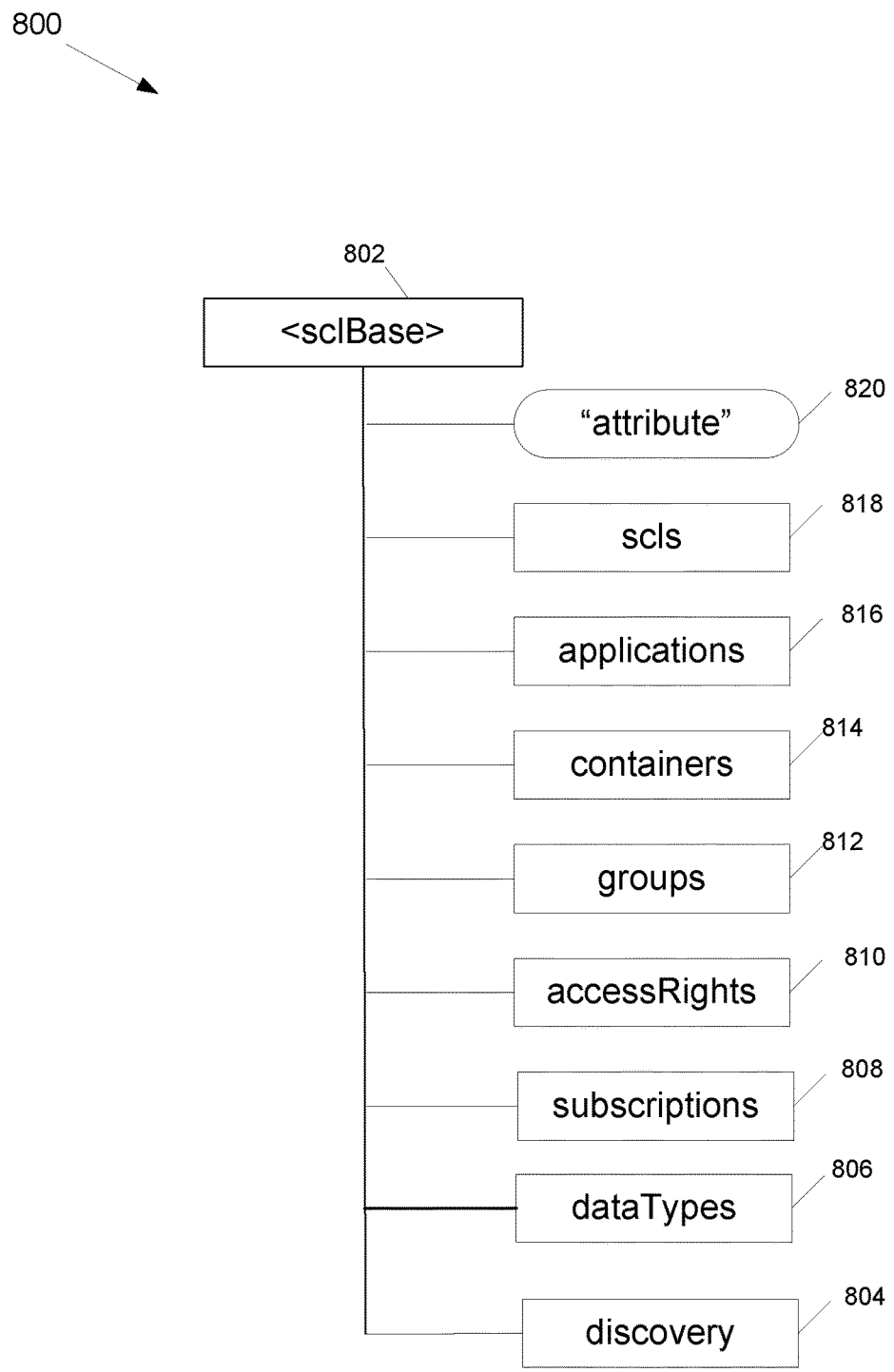
FIG. 8 illustrates a resource tree <sclBase> for content awareness where a complex data type can be defined by data types for later reference according to some embodiments.

In some embodiments the new attributes 706, 708, 710 may be added to a different portion of the <sclBase> (see FIG. 8). For example, in some embodiments the new attributes 706, 708, 710, may be added to the ETSI M2M defined <container> (see FIG. 12) or contentInstances (see FIG. 11). In some embodiments, contentDefinition 710 and contentFormat 708 may be merged into a single attribute.

In some embodiments, the attributes 704 may be attributes for content awareness for complex data types. For example, a complex data type may be data that is described using more than a single value or data point. For example, the attributes 704 may include a set of multiple data elements such as fields, members, objects, or structures that can be of different data types. For example, the attributes 704 may be attributes 704 for an application specific data structure such as a message including a header and payload fields.

FIG. 8 illustrates a resource tree <sclBase> for content awareness where a complex data type can be defined by data types for later reference according to some embodiments. Illustrated in FIG. 8 is resource tree sclBase 802, including attribute 820, scls 818, applications 816, containers 814, groups 812, accessRights 810, subscriptions 808, dataTypes 806, and discovery 804. In some embodiments, attribute 820, scls 818, applications 816, containers 814, groups 812, accessRights 810, subscriptions 808, and discovery 804 may be as disclosed in ETSI M2M. Resource dataTypes 806 may be a definition of a complex data type. In some embodiments, one or more dataTypes 806 collections could be supported elsewhere in the SCL resource tree. For example, dataTypes 806 may be defined under containers 814, which may, in some embodiments, define dataTypes 806 with a scope limited to or access rights limited to an instance of the containers 814 where the dataTypes 806 are defined.

In some embodiments, SCL may be provided with content based awareness for complex data types by using dataTypes 806 and a content description attribute for the content instance resource that defines the complex data type definition of the content within the content instance resource.

Figure 9:
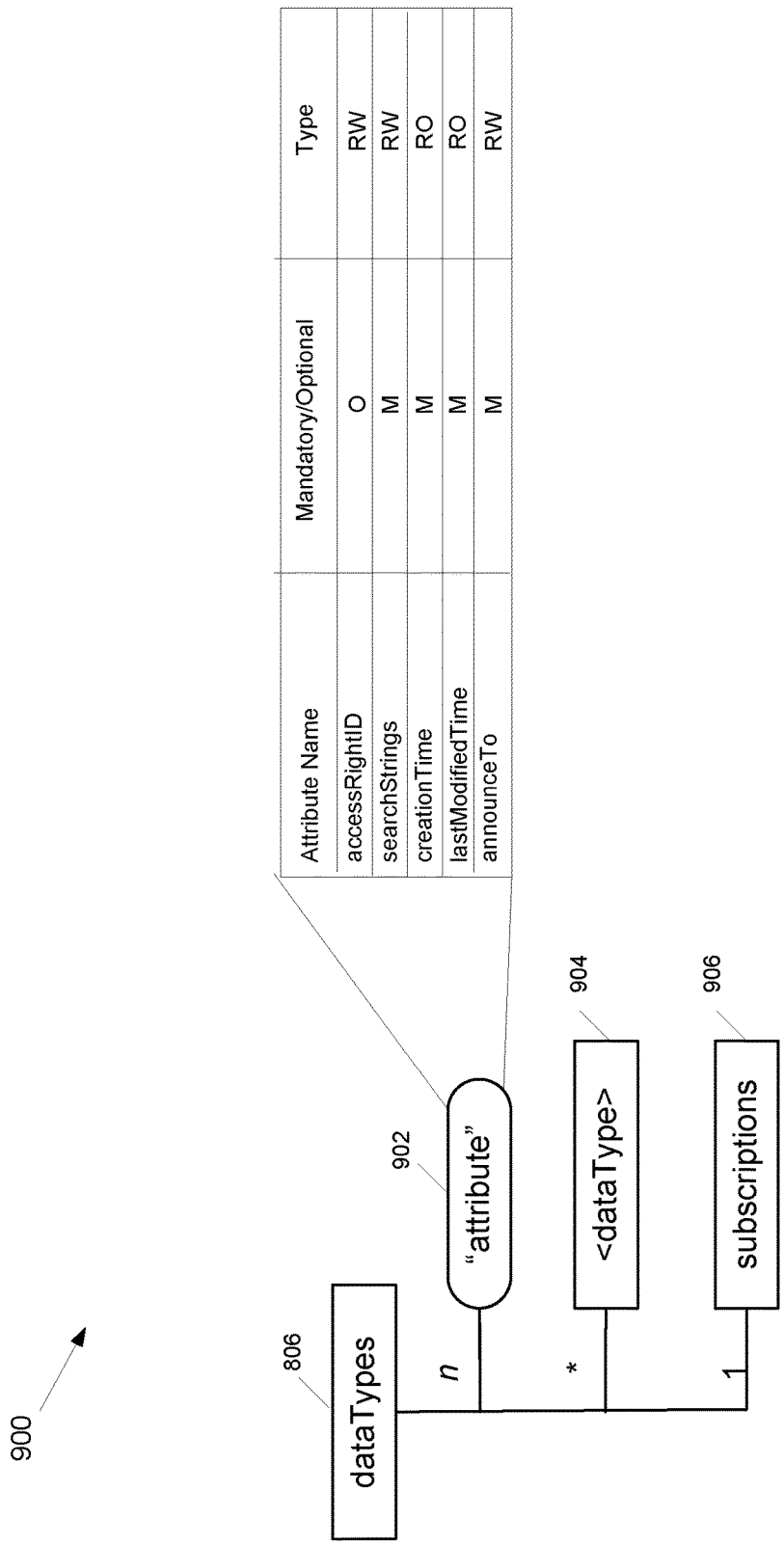
FIG. 9 illustrates data type definition for complex data types according to some embodiments.

FIG. 9 illustrates data type definition for complex data types according to some embodiments. In some embodiments, each data type definition is stored in a <dataType> 904 resource instance. Illustrated in FIG. 9 are dataTypes 806, attribute 902, <dataType> 904, and subscriptions 906. The dataTypes 806 may be a resource container to hold definitions of complex data types. The attribute 902 may be attributes of the dataTypes 806. The <dataTypes> 904 may be definitions of data types that may be complex data types. The subscriptions 906 may be a container to hold subscriptions of an application or SCL that may be invoked when there is a change in the dataTypes 806 container. In some embodiments, the definitions in the dataTypes 806 collection can be re-used and referenced by an SCL or application. Each data type definition may be stored in a <dataType> 904 resource instance.

Figure 10:
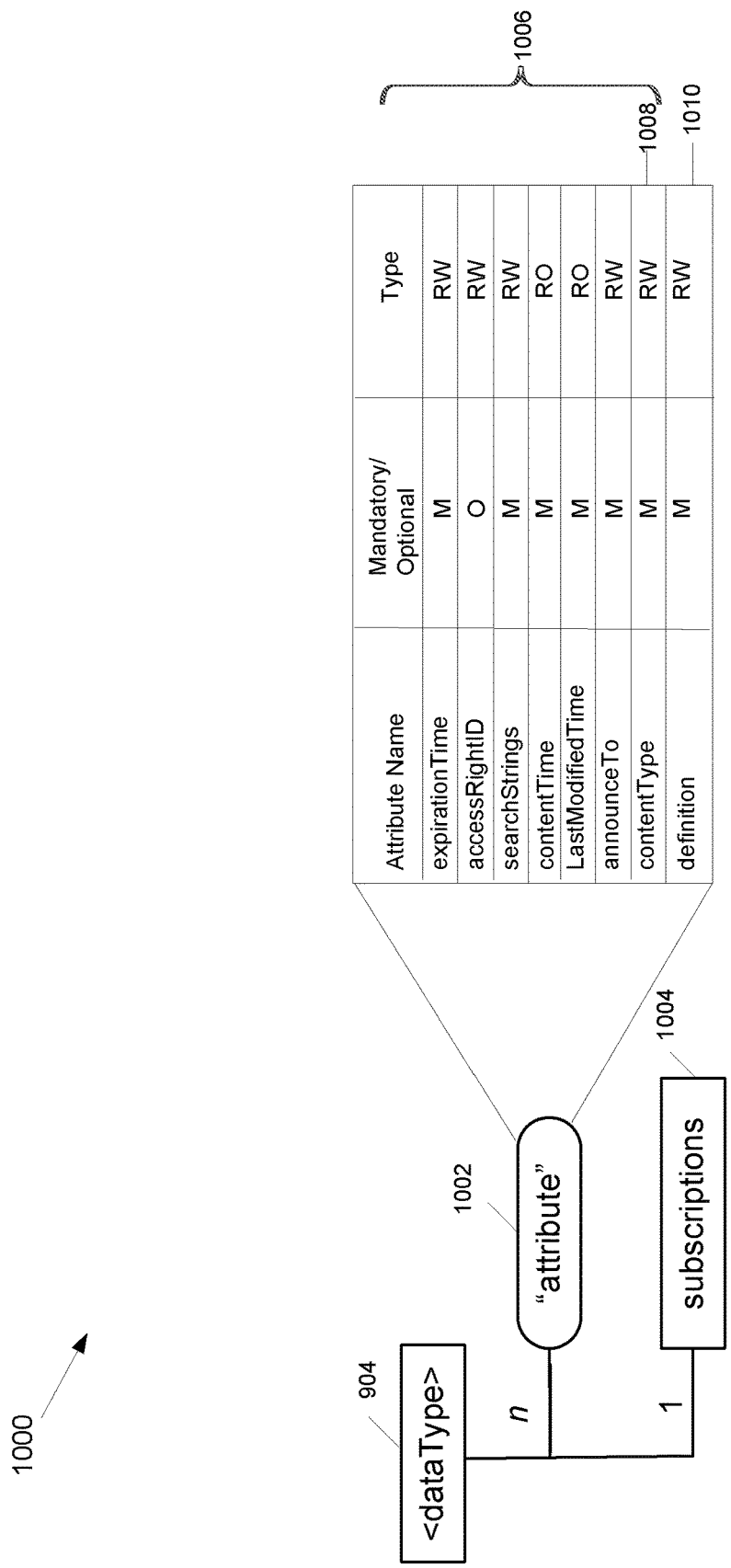
FIG. 10 illustrates the <dataType> instance which includes an attribute definition according to some embodiments.

FIG. 10 illustrates the <dataType> 904 instance which includes an attribute definition according to some embodiments. In some embodiments, some of the attributes 1002 may be attributes 1006 as disclosed in ETSI M2M. In some embodiments, definition 1010 may be an attribute 1002 to define the semantics of the <dataType> 904, which may include the names of different data elements, their order and their type. In some embodiments, the definition 1010 may include definitions that define how to perform operations on the data. In some embodiments, the definition 1010 may include definitions that include knowledge representation language for the data. In some embodiments, the definition 1010 may include definitions that include class definitions for the data, which may refer to known class definitions. In some embodiments, the syntax in which definition 1010 is encoded may be specified by contentType 1008 of the <dataType> 904 resource. For example, contentType 1008 can be set to a value of 'XML' or 'JSON' to indicate that the definition 1010 is encoded as an XML schema or JSON schema description, respectively. As another example, the contentType 1008 may be an RDF schema.

Figure 11:
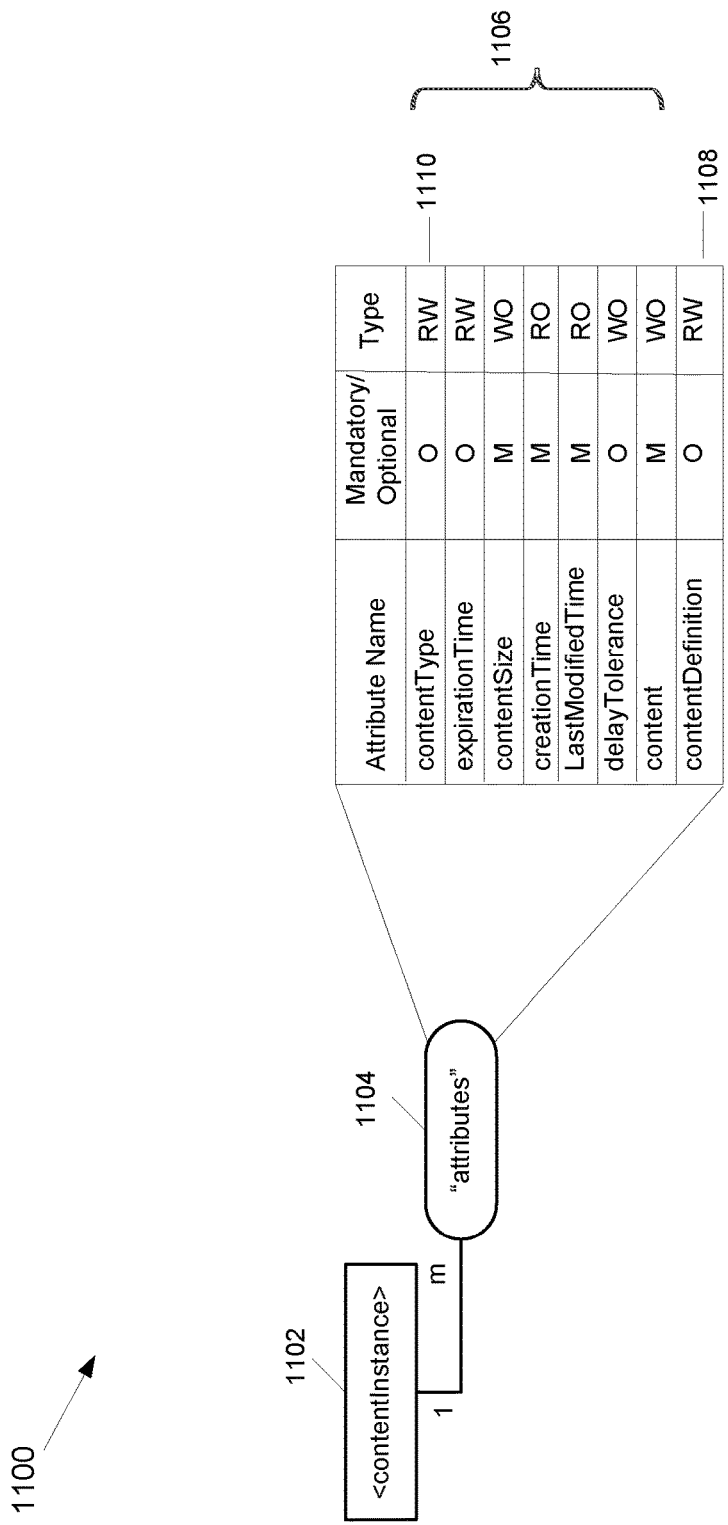
FIG. 11 illustrates a contentDefinition that may include a semantic description of the content or may identify a dataType of a contentinstance.

FIG. 11 illustrates a contentDefinition that may include a semantic description of the content or may identify a dataType of a contentinstance. In some embodiments, <contentInstance> 1102 may be as disclosed in ETSI M2M, which includes attributes 1106. In some embodiments, the contentDefinition 1108 may include a semantic description of the content such as the names of the different data elements, their order and their type. In some embodiments, the contentDefinition attribute 1108 may reference a definition of <dataType> 904 (see FIGS. 9 and 10). For example, the contentDefinition attribute 1108 may be a uniform resource identifier (URI) that references a definition of a <dataType> 904 defined within a dataTypes collection 806.

In some embodiments, if the contentDefinition 1108 attribute contains a semantic description, the syntax used for this description may be defined by the contentType 1110 attribute of contentInstance resource 1102. For example, the contentType 1110 attribute can be set to a value of 'XML' or 'JSON' to indicate that the contentDefinition 1108 attribute is encoded as a XML schema or JSON schema description. In some embodiments, contentDefinition 1108 enables an SCL or an application to interpret the contentInstance 1102, which may be a complex data type. In some embodiments, contentDefinition 1108 is added to a different portion of the <sclBase> resource tree 802. In some embodiments, contentDefinition 1108 is added to the <container>. In some embodiments, contentDefinition 1108 is added to contentInstances collection.

Figure 12:
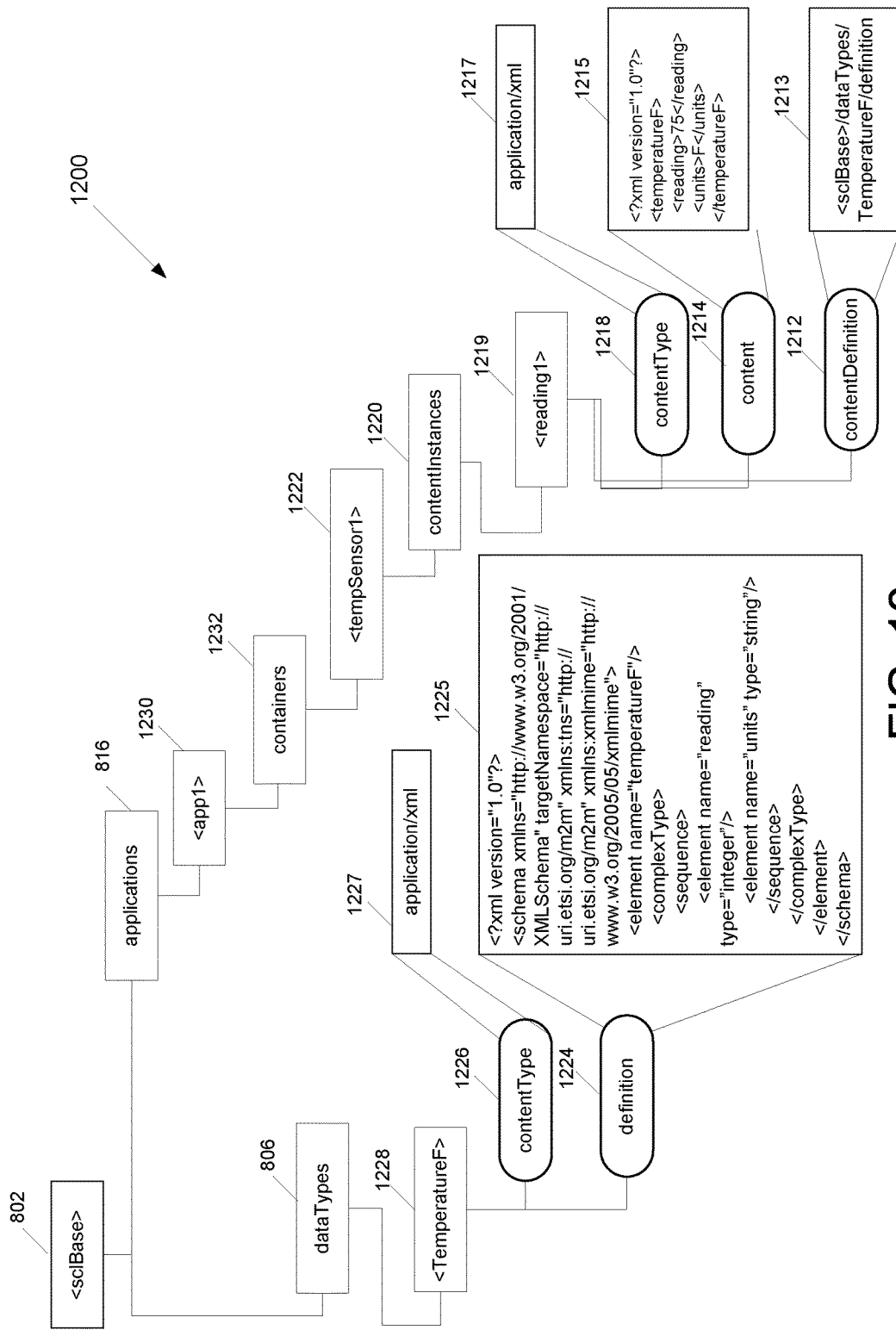
FIG. 12 illustrates an example of content awareness for complex data types according to some embodiments.

FIG. 12 illustrates an example of content awareness for complex data types according to some embodiments. Illustrated in FIG. 12 is a complex data type called <TemperatureF> 1228 defined in XML format 1225 within the proposed dataTypes collection 806. ContentType 1226 is an attribute such as contentType 1110 described in conjunction with FIG. 11. Definition 1224 may be a contentDefinition 1108 as described in conjunction with FIG. 11. The contentType 1226 has a value of application/xml 1227. The definition 1224 has a value of an XML schema 1225. The applications 816 includes an application instance <app1> 1230. A container instance <tempSensor1> 1222 and a contentInstances 1220. A resource <reading1> 1218 is an instance of the contentInstances 1220. Resource <reading1> 1218 has an attribute contentType 1218 of application/XML 1217, and a contentDefinition 1212 that points to the definition of <TemperatureF> 1213. The content 1214 of <reading1> 1219 may then be interpreted using the XML schema 1225 in the definition of <TemperatureF> 1228. <TemperatureF> is a complex data type.

Figure 13:
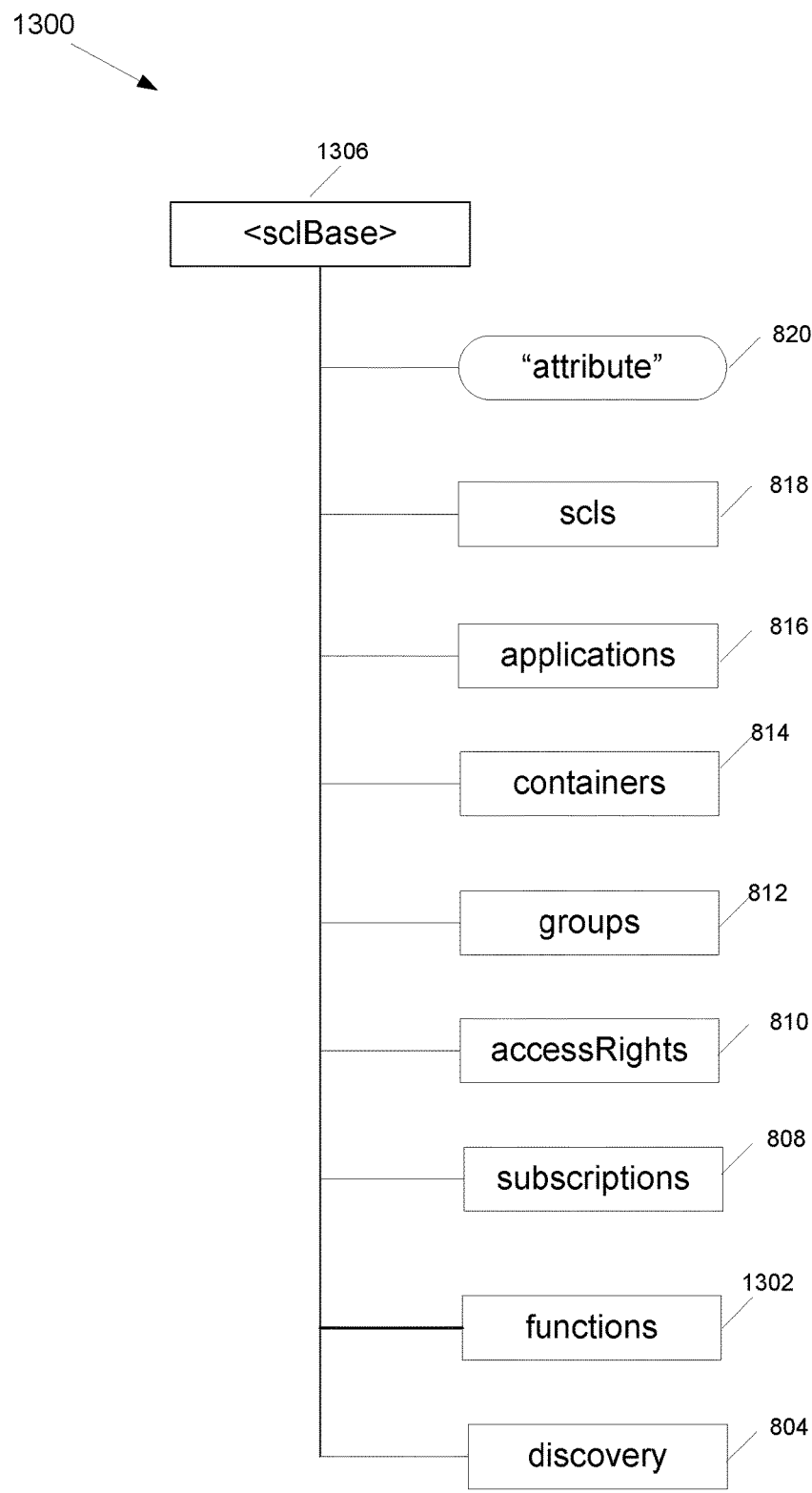
FIG. 13 illustrates a functions collection located within a <sclBase> resource tree of a M2M structure.
Figures 16A, 16B:
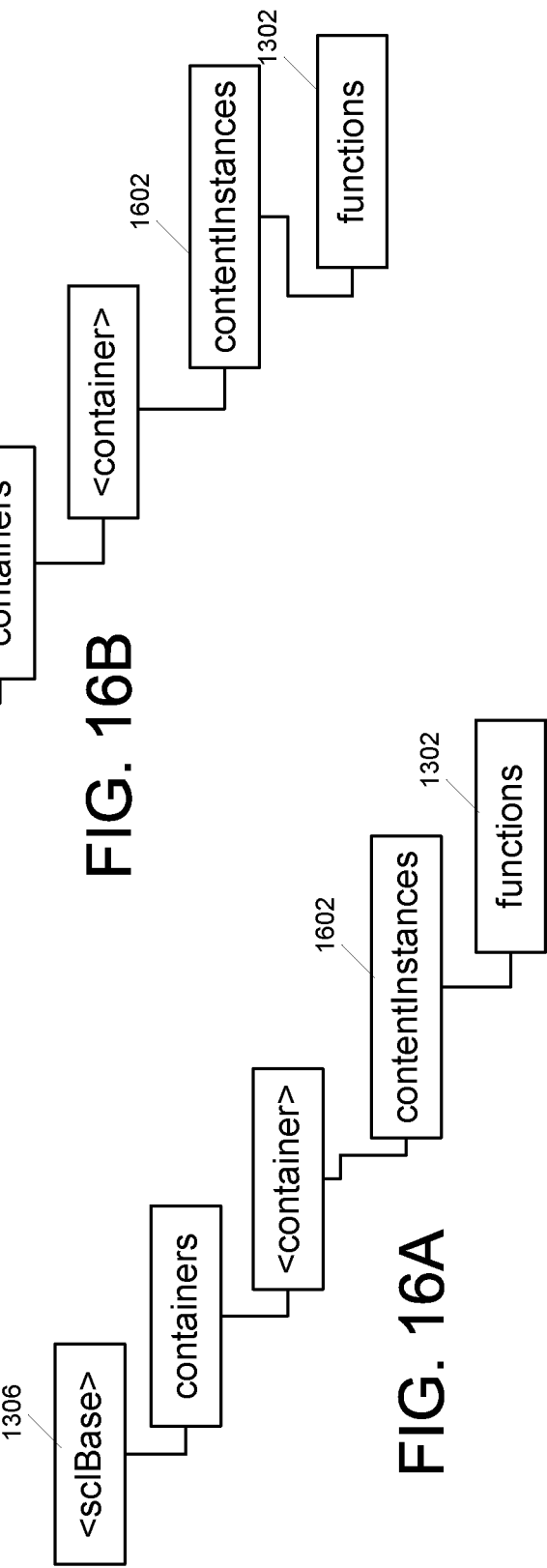
Figures 16C, 16D:
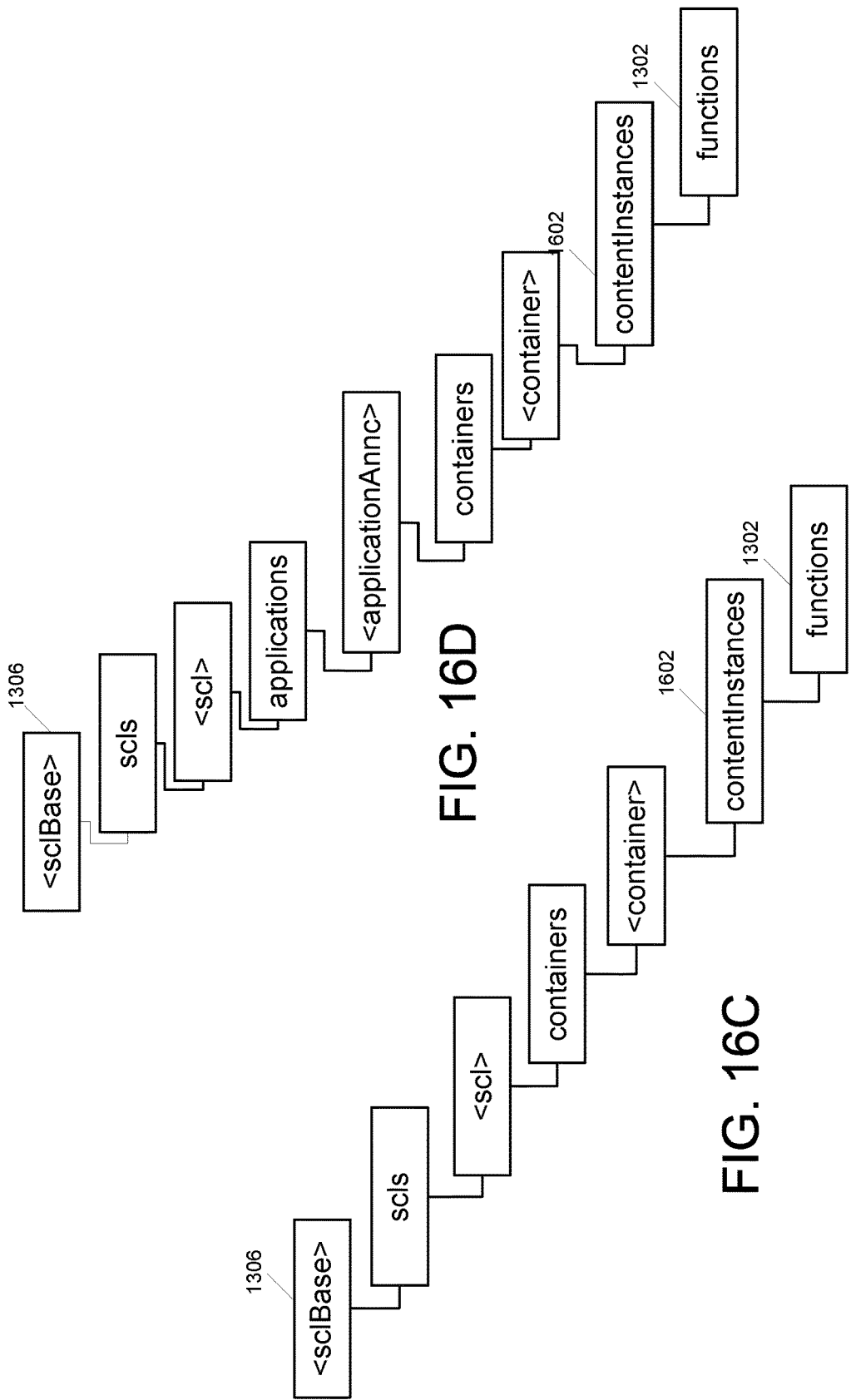
Figure 17B:
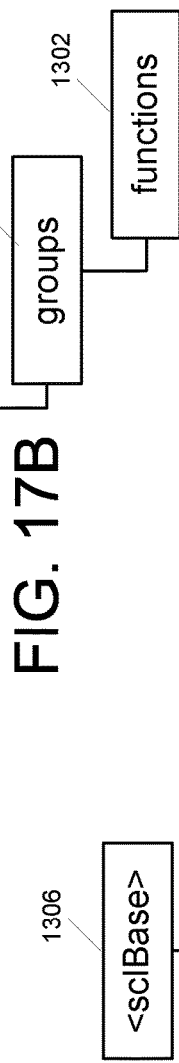
Figure 17D:
Figure 17A:
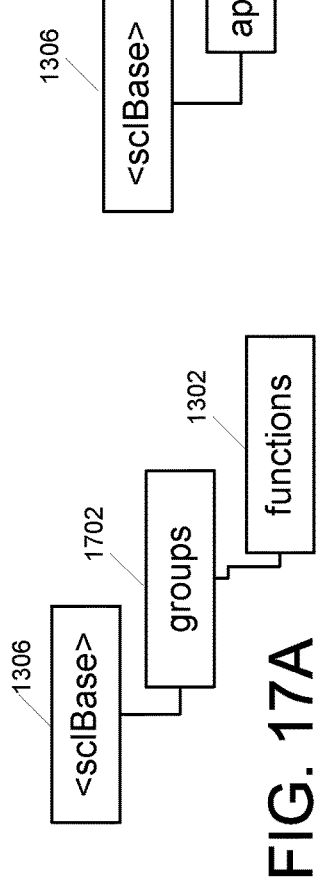
Figure 17C:
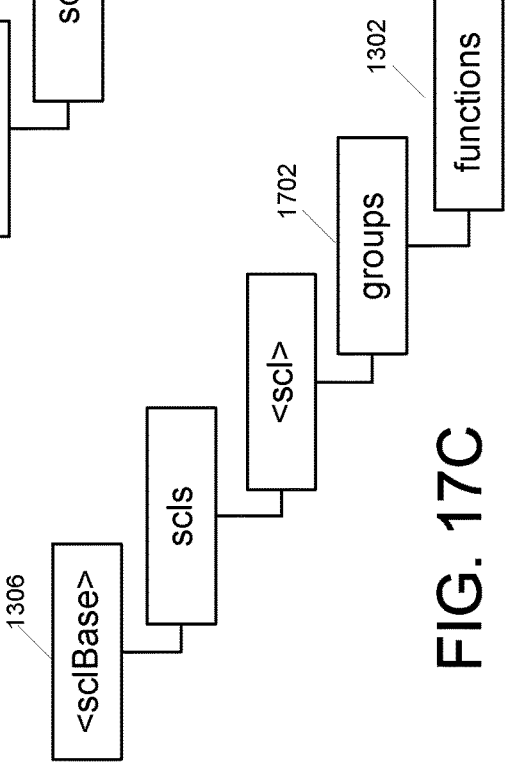

FIG. 13 illustrates a functions collection located within a <sclBase> resource tree of a M2M structure. Illustrated in FIG. 13 is a <sclBase> resource tree 1306 which may include attribute 820, scls 818, applications 816, containers 814, groups 812, accessRights 810, subscriptions 808, functions 1302, and discovery 804. The functions collection 1302 may be termed under the <sclBase> resource tree 1306. In some embodiments, the <sclBase> 1306 may be a resource structure as disclosed in ETSI M2M structure. The functions collection 1302 may include instances of context aware functions. An application or a SCL may use the functions to deduce context from the content that is either stored in the SCL, for example in a container resource 814, or passed into the SCL when the function is invoked by an application or other SCLs. SCL can provide value-added context aware services for applications and other SCLs using functions defined in the functions 1302.

In some embodiments, an SCL supports a library of native context aware functions 1302. In some embodiments, the functions 1302 can be conditionally instantiated by an SCL at certain places in the SCL resource structure, for example based on a content type of a resource, and invoked upon detecting a trigger condition, for example the creation of a new <contentInstance>. In some embodiments, these functions 1302 can be discovered and invoked by applications or other SCLs. In some embodiments, functions can be selectively instantiated under certain resources in the SCL structure by applications or other SCLs. In some embodiments, functions can be discovered and then retrieved from the SCL. The application can then create a copy of the function under the desired SCL resource and configure its trigger condition if desired.

In some embodiments, the SCL includes support mechanisms that allow applications or other SCLs to create context aware functions 1302 within the SCL. In some embodiments, the functions 1302 can then be configured to be invoked autonomously by an SCL, for example a trigger condition can be defined by the application, or the functions can be invoked explicitly by applications or other SCLs.

In some embodiments, the functions 1302 support context aware service for a SCL within ETSI M2M. In some embodiments, one or more functions 1302 provide a RESTful mechanism to support content aware functions 1302 in the SCL. The SCL can generate context information by processing content that is either stored in the SCL, for example in a contentInstance resource, or passed into the SCL when the function 1302 is called by an application. The resulting context information can then be used by applications and the SCL.

FIGS. 14, 15, 16, 17, 18, and 19 illustrate structures for locating the functions collection according to some embodiments. In some embodiments, the functions resource 1302 may be located remotely across a network. In some embodiments, the functions resource 1302 may be located in the cloud.

Illustrated in FIGS. 14A-D is the functions resources 1302 located under containers collection resource 1402 according to some disclosed embodiments.

Illustrated in FIGS. 15A-D is the functions resources 1302 located under <container> resource 1502 according to some disclosed embodiments.

Illustrated in FIGS. 16A-D is the function resources 1302 located under contentInstances collection 1602 according to some disclosed embodiments.

Illustrated in FIGS. 17A-D is the function resource 1302 located under groups collection resource 1702 according to some disclosed embodiments.

Illustrated in FIGS. 18A-D is the function resource 1302 located under <group> resource 1802 according to some disclosed embodiments.

Illustrated in FIGS. 19A-D is the function resource 1302 located under applications 1902 according to some disclosed embodiments. Illustrated in FIG. 19B function resource 1302 is located under applications 1902 and the <application> resource 1904. Illustrated in FIG. 19D function resource 1302 is located under applications 1902 and <applicationAnnc> 1906.

FIGS. 20A and 20B illustrate sub-resources and attributes of functions collection. In some embodiments, the functions collection 1302 contains instances of <function> 2004 resource and/or announced <functionAnnc> 2002 resources. For example, the functions collection 1302 under <sclBase> 1306 illustrated in FIG. 20A may contain <function> resources 2004, which may, in some embodiments, represent locally hosted functions. The functions collection 1302 illustrated in FIG. 20B under <sclBase> 1306, scls 2006, and <scl> 2008, may contain <functionAnnc> resources 2002, which may, in some embodiments, represent remote functions, which in some embodiments may be hosted on the corresponding <scl> 2008. The subscriptions resource 2010 under functions 1302 contains a collection of 0 . . . n <subscription> resources (not illustrated) that represent individual subscriptions to a subscribable <function> 2004 of functions 1302. Subscribers may be applications or the hosting SCL, or other SCLs. In some embodiments, subscribers may subscribe to changes to the functions resource 1302. For example, when a new <function> 2004 is created or a <function> 2004 is modified or deleted, the scriber may be notified of the change.

FIG. 20C illustrates the attributes 2020 which the functions may include. In some embodiments, the attributes 2020 may be as disclosed in the ETSI M2M standards.

A <function> 2004 may be an individual function stored within a functions collection 1302 as an instance of a <function> resource 2004. In some embodiments, an instance of a <function> 2004 may be created, retrieved, updated, deleted and executed by an SCL, or by an application. In some embodiments, an instance of a <function> 2004 may be created, retrieved, updated, deleted and executed by an SCL, or by an application in a RESTful manner.

FIG. 21A illustrates instances of <function> resource. Illustrated in FIG. 21A is an input 2102, <function> 2106, and output 2104. In some embodiments, a <function> 2106 is an instance of a function collection 1302. A <function> 2106 may be a low-level contextual function, which may be used to generate contextual cues from content and semantics. For example, a <function> 2106 may be a function to compute a minimum, maximum, or average of values of a set of contentInstances 1220, which may have the same contentType 1218. The input 2102 may be values of a set of contentInstances 1220 having the same contentType 1218, and the output 2104 may be the minimum, maximum, or average of the input 2102.

FIG. 21B illustrates instances of <function> resource. Illustrated in FIG. 21B is input 2112, <function> 2110, and output 2114. In some embodiments, a <function> 2110 is an instance of a function collection 1302. In some embodiments, a <function> 2110 may be a high-level contextual <function> 2110 used to generate situational context output 2114 from input 2112 of lower level contextual cues, content and semantics. For example, <function> 2110 may determine whether there is a meeting going on in a room based on input 2112 of whether the lights are on, input 2112 of whether people are occupying chairs, and input 2112 of whether the noise level in the room is above a defined threshold.

FIGS. 22A and 22B illustrate a <function> resource including sub-resources and attributes according to some embodiments. The <function> 2004 contains sub-resources inputTypes 2204, outputTypes 2206, outputInstances 2208, subscriptions 2210, and attributes 2202. In some embodiments, attributes 2202 may include one or more of the following: functionDescription 2230, pointer 2232, execute 2234, triggerCriteria 2236, other attributes 2238. The other attributes 2238 may be attributes as disclosed in ETSI M2M SCL. In some embodiments, functionDescription 2230 may provide information describing the <function> 2004 such as its overall objective and possibility descriptions for each of the required or optional inputs and outputs. In some embodiments, searchStrings 2240 may provide information describing the function such as its overall objective and possibility descriptions for each of the required or optional inputs as well as the outputs.

In some embodiments, pointer 2232 contains a memory address to the start of the <function> 2004 implementation. The address may reference an internal SCL memory location or a URI to a remote <function> 2004, which may be hosted in an application, which may be a remote application. The pointer 2232 may be used by the SCL or an application to call the <function> 2004. In some embodiments, the pointer 2232 may only be visible to the local SCL. Execute 2234 may be used to RESTfully invoke the <function> 2004.

TriggerCriteria 2236 may be configured with conditions under which SCL autonomously invokes the <function> 2004. In some embodiments, the triggerCriteria 2236 may be one or more create/read/update/delete (CRUD) operations upon a specified resource or hierarchy of resources. In some embodiments, the triggerCriteria 2236 may be one or more system events such as running low on memory resources, or a detection of a security threat, etc. In some embodiments, the triggerCriteria 2236 may be a detection of a specific M2M operation such as expiration time of a resource was reached, a resource was modified, or access rights were modified, etc.

Figures 23A, 23B:
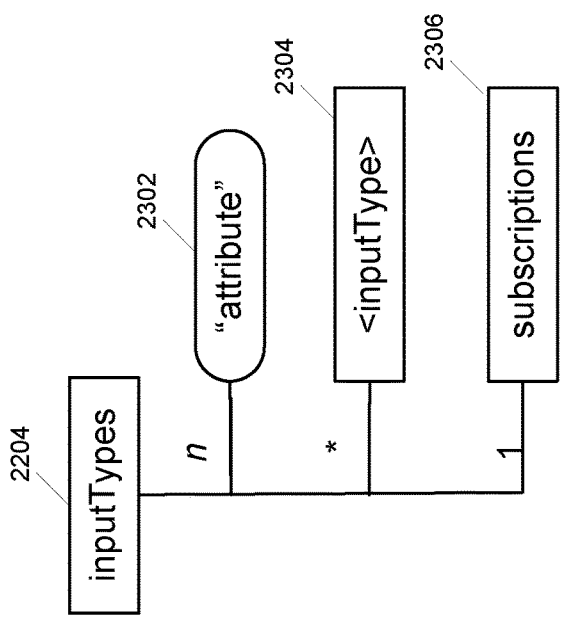
FIG. 23A illustrates an inputTypes collection including sub-resources and attributes according to some embodiments.
FIG. 23B illustrates attributes according to some embodiments.

FIG. 23A illustrates an inputTypes collection including sub-resources and attributes according to some embodiments. A <function> 2004 may or may not require input parameters. In some embodiments, the inputTypes collection 2204 may be used by a SCL or an application to discover the required input parameters of a <function> 2004. In some embodiments, the inputTypes collection 2204 includes the type declarations for each of the input parameters supported by the <function> 2004.

FIG. 23B illustrates attributes according to some embodiments. In some embodiments, the attributes 2308 may be as disclosed in an ETSI M2M specification. In some embodiments, nrOfInputs 2310 may be the number of inputs to a <function> 2004.

Figure 24:
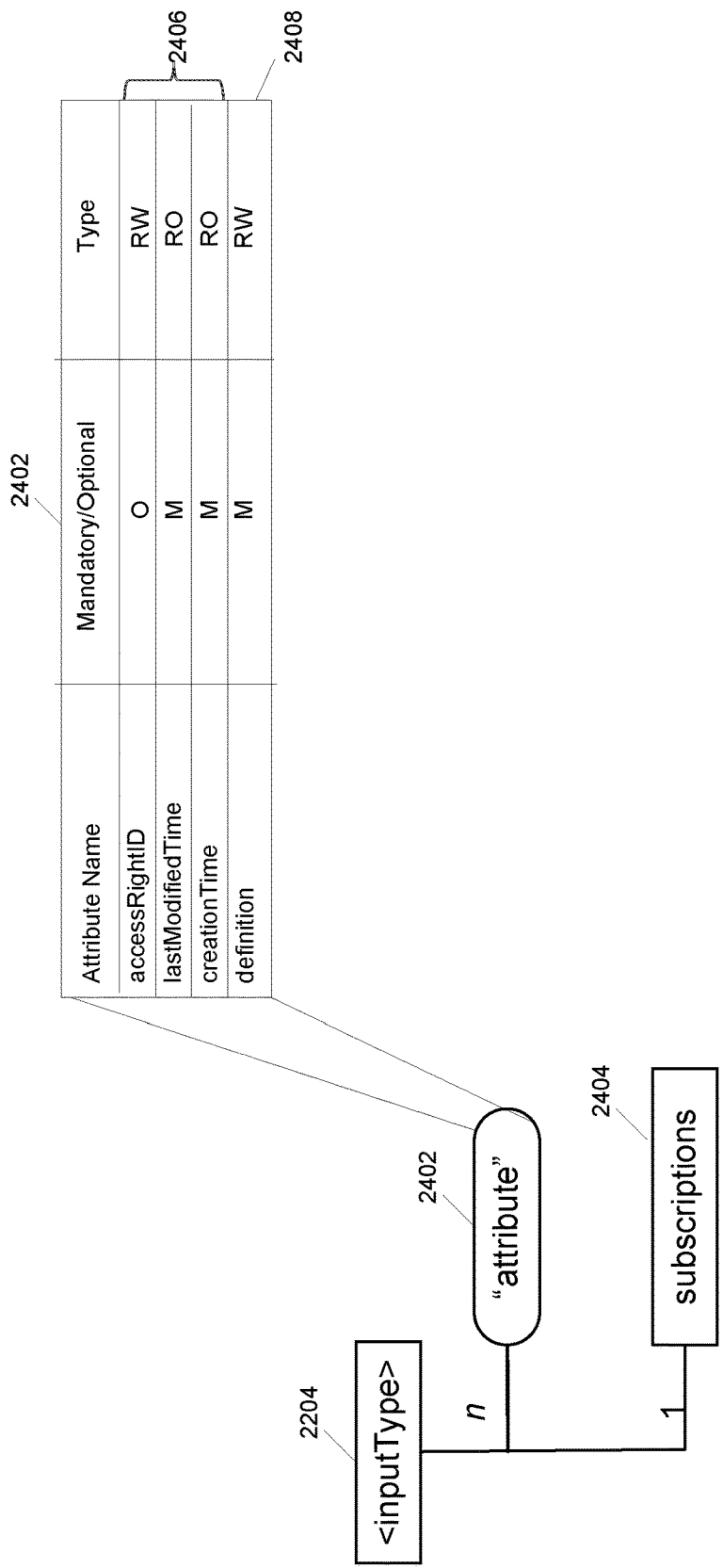
FIG. 24 illustrates an <inputType> resource with attributes and subscriptions.

FIG. 24 illustrates an <inputType> resource with attributes and subscriptions. In some embodiments, each input parameter type is defined by a separate <inputType> 2204 instance using the definition 2408. Definition 2408 can contain a basic data type declaration supported natively by the SCL or a complex data type declaration. The definition 2408 can contain the actual type declaration or can reference an existing declaration defined within a dataTypes 806 collection. See, for example, the disclosure in conjunction with FIGS. 8-12. In some embodiments, a single instance of <inputType> 2204 may be used to define multiple input parameters in a complex data type rather than using separate instances for each input parameter.

In some embodiments, the type declarations of the input parameters to a <function> 2004 are defined using attributes in the <function> 2004 rather than defining separate <inputTypes> 2204. For example, the type declarations of the input parameters to a <function> 2004 may be included in the functionDescription 2230 or one or more other attributes 2202. The one or more attributes 2202 may contain the declaration of a complex data type for one or more input parameters to the <function> 2004. In some embodiments, the one or more attributes 2202 contains a URI that references an existing data type declaration within a SCL dataTypes 806. The attributes 2402 may include attributes 2406 as disclosed in a M2M specification such as the ETSI M2M specification.

Figure 25:
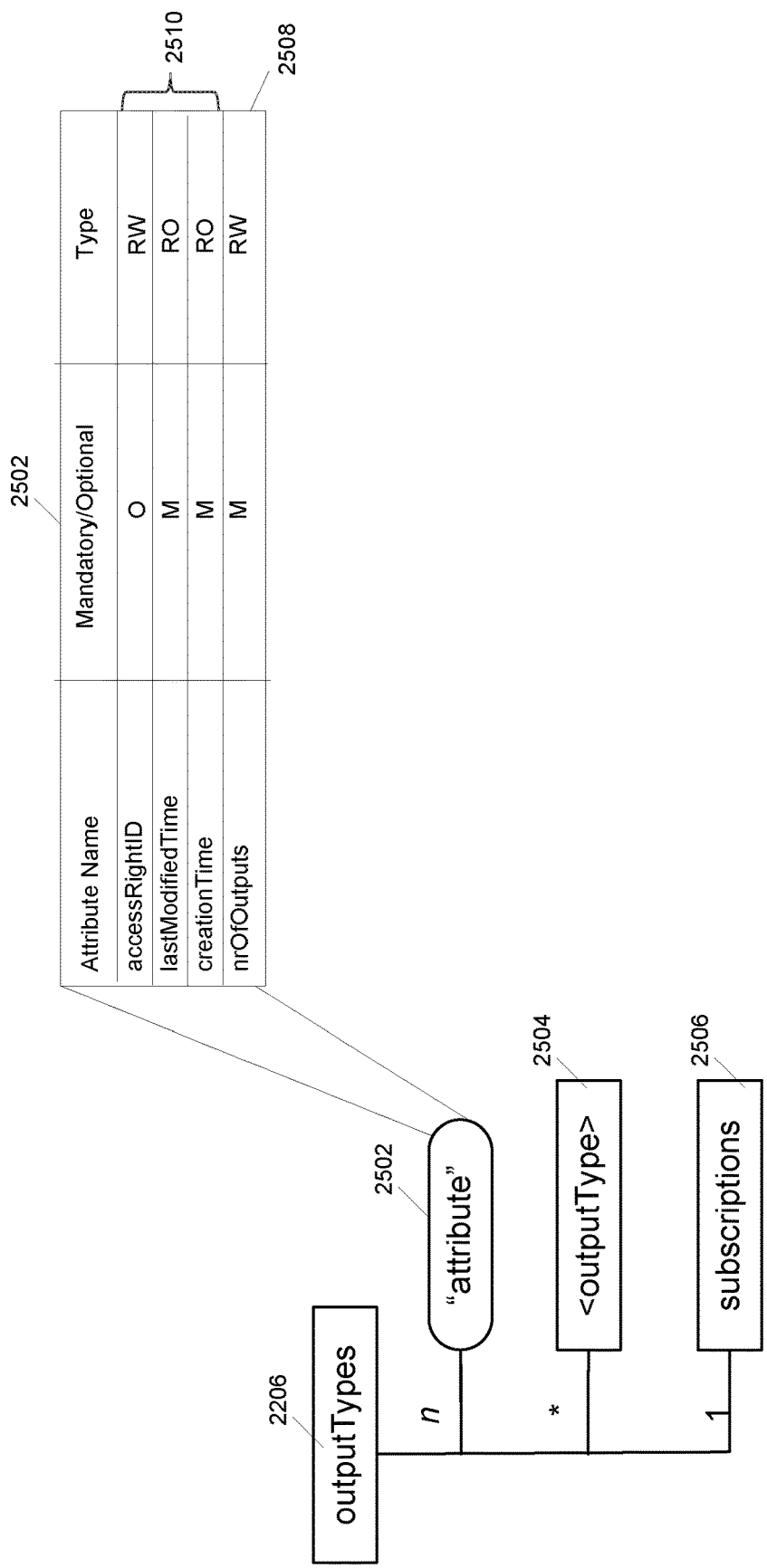
FIG. 25 illustrates outputTypes collection with attributes, <outputType>, and subscriptions.

FIG. 25 illustrates outputTypes collection 2206 with attributes, <outputType>, and subscriptions. The outputTypes collection 2206 may be used by the SCL or an application to discover the type of output generated by a <function> 2204. The outputTypes collection 2206 may contain one or more type declarations for the output generated by the <function> 2204. In some embodiments, if an output is complex and consists of multiple fields having different types, each can be defined by a separate instance of an <outputType> 2504. In some embodiments, a single instance of <outputType> 2504 may be used to define the output using a complex data type. In some embodiments, the definition attribute 2610 (see FIG. 26) may contain a basic data type declaration supported natively by the SCL or a complex data type declaration as described in conjunction with FIGS. 8-12. The definition 2610 may contain the actual type declaration or can reference an existing declaration defined within a dataTypes collection. The attributes 2502 may include attributes 2510 according to a M2M specification such as an ETSI M2M specification. In some embodiments, the nrOfOutputs 2508 may be a number of outputs of the <function> 2204.

Figure 26:
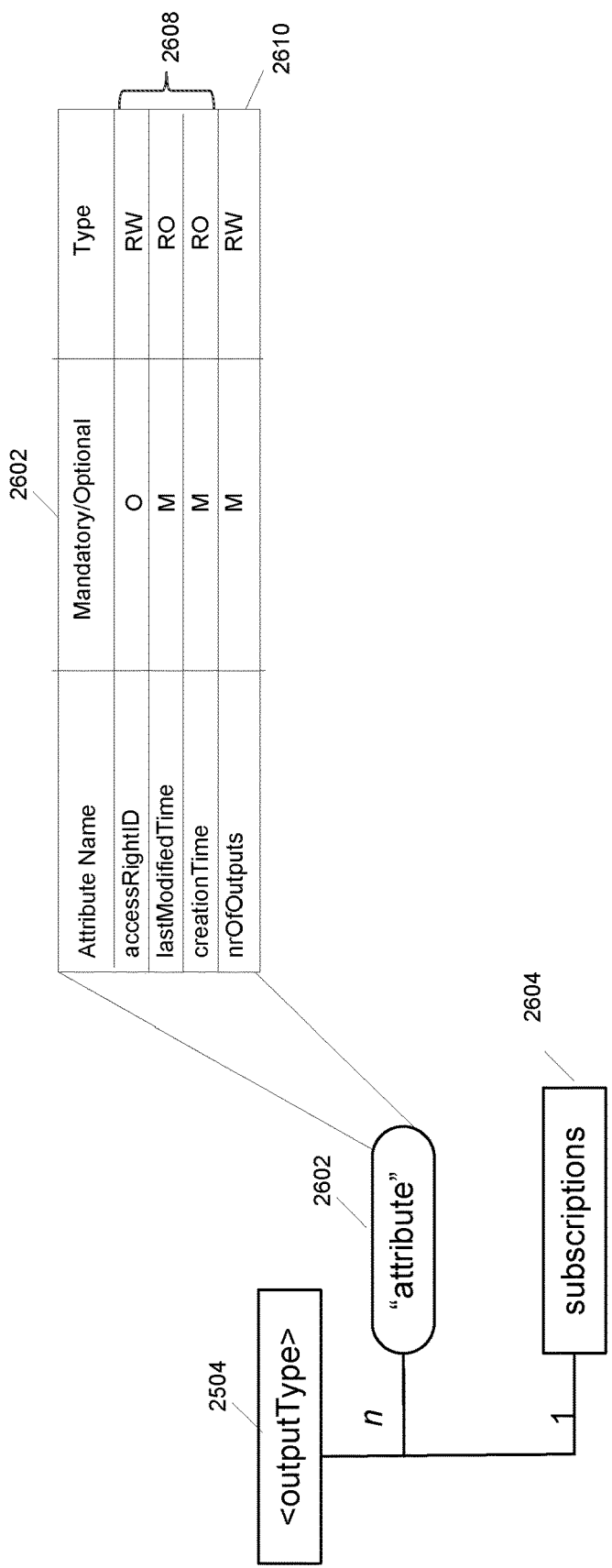
FIG. 26 illustrates <outputType> instance with attributes and subscriptions.

FIG. 26 illustrates <outputType> instance 2504 with attributes and subscriptions. The attributes 2602 may include attributes 2608 in accordance with a M2M specification such as an ETSI M2M specification. In some embodiments, the type declarations of the outputs to a function could be defined using one or more attributes in the <function> resource rather than defining separate <outputTypes> 2504. For example, this information may be included in the functionDescription attribute or included in one or more additional attributes. In some embodiments, the additional one or more attributes may contain the declaration of a complex data type for one or more fields in the output. In some embodiments, the one or more additional attributes may contain a URI that references an existing data type declaration within an SCL dataTypes collection.

Figure 27:
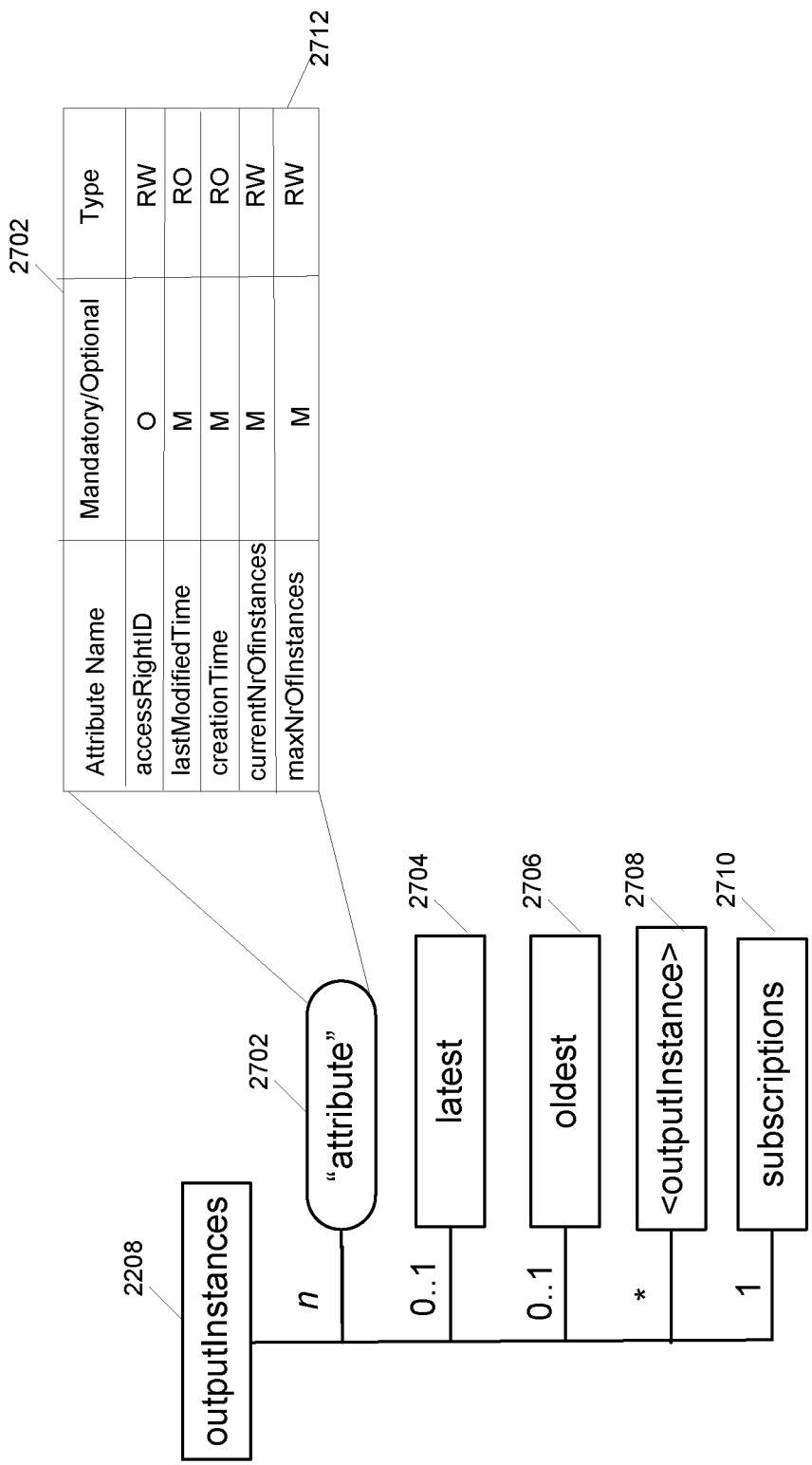
FIG. 27 illustrates an outputInstances collection with attributes and sub-resources.

FIG. 27 illustrates an outputInstances collection 2208 with attributes and sub-resources. A <function> 2004 may generate output each time it is invoked. The outputInstances 2208 may store this output in the SCL such that applications and SCLs can discover and access the output. The sub-resources may include latest 2704, oldest 2706, <outputInstance> 2708, and subscriptions 2710. The latest 2704 may contain a reference to the latest 2704 <outputInstance> resource 2708. The oldest 2706 may contain a reference to the oldest <outputInstance> resource 2708. The attributes 2702 may be in as disclosed in an M2M specification such as an ETSI M2M specification.

Figure 28:
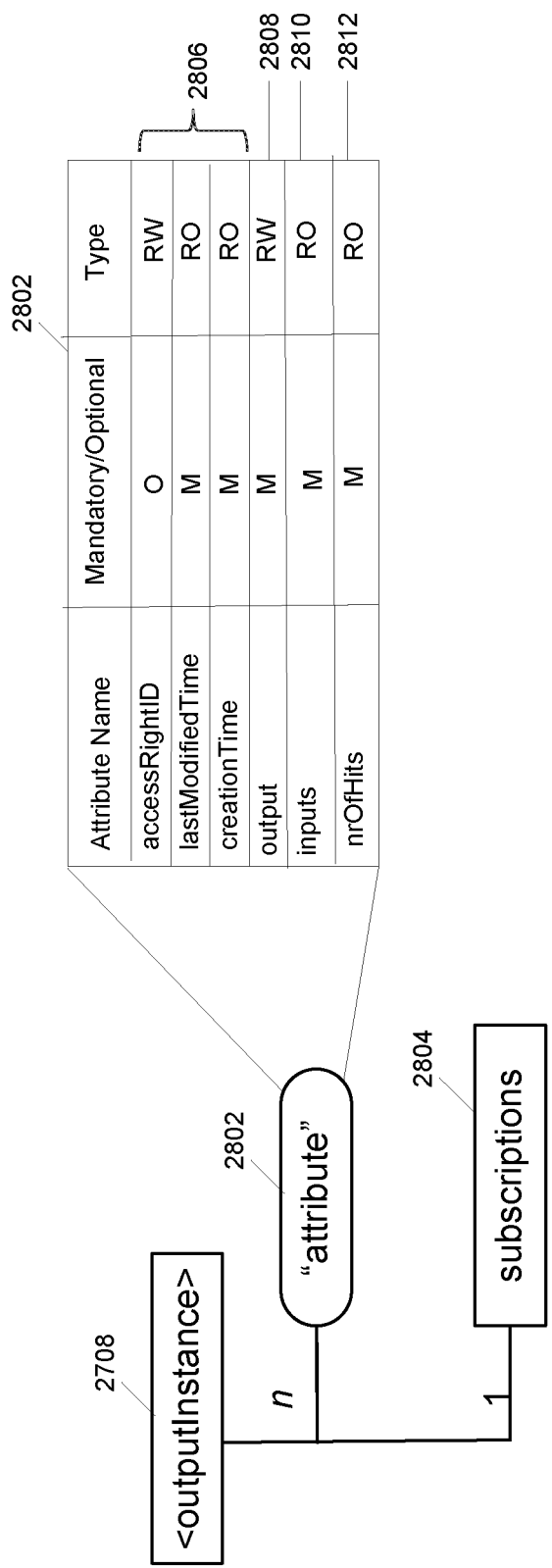
FIG. 28 illustrates <outputInstance> resource with attributes and subscriptions according to some embodiments.

FIG. 28 illustrates <outputInstance> resource 2708 with attributes 2802 and subscriptions 2804 according to some embodiments. The attributes 2802 may be in accordance with a M2M specification such as a ETSI M2M specification. Output 2808 may contain either an output instance from the <function> or a reference such as an URI to an <outputinstance> 2708 that is stored elsewhere such as in a contentInstance resource within the local SCL, a remote SCL, or even in an application resource. Inputs 2810 may contain copies of the input parameters (if any) that were passed in when the <function> was invoked. In some embodiments, the inputs 2810 attribute is used to support caching of the <outputInstance> 2708. In some embodiments, if multiple inputs are present, they are stored as a sequential list in the inputs 2810 attribute. In some embodiments, a collection may be used in which individual sub-resources for each input parameter could be supported in the <outputInstance> 2708, which may be similar to the inputTypes collection disclosed above. NrOfHits 2812 may be a counter which is incremented by the SCL each time the <outputInstance> 2708 is used to service a <function> invocation request. The NrOfHits 2812 attribute may be used to support caching of the <outputInstance> 2708.

Figure 29:
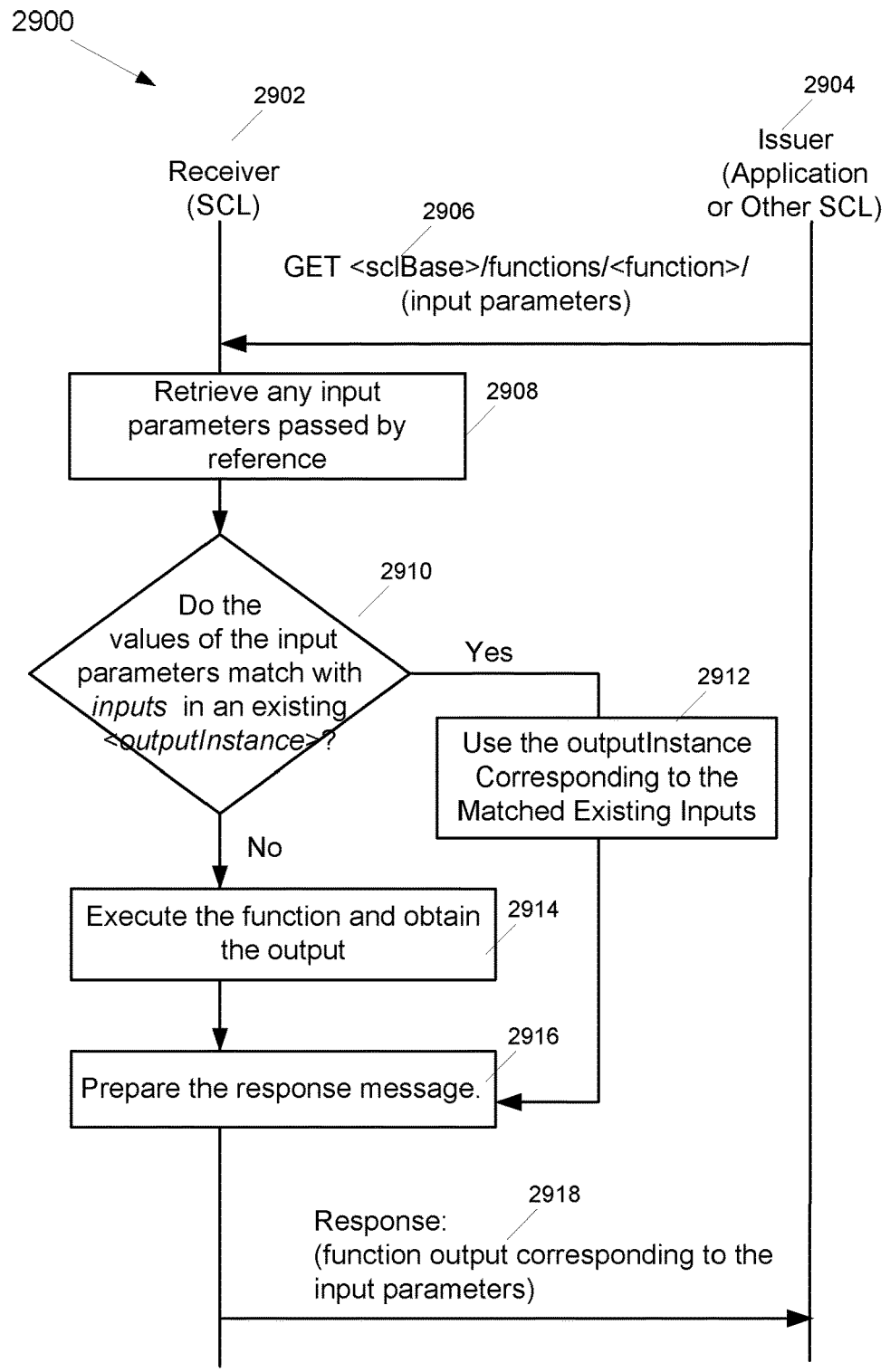
FIG. 29 illustrates a method for outputInstance function caching according to some embodiments.

FIG. 29 illustrates a method for outputInstance function caching according to some embodiments. The method 2900 may begin with an issuer 2904 sending a GET 2906 to the receiver SCL 2902. The method 2900 may continue with a SCL 2902 retrieving the values of the input parameters that were passed by reference by using the URI(s) in the request message at 2908. In some embodiments, there may be no input parameters or the input parameters may be passed by value. After the SCL 2902 gets all the values of the input parameters, it compares them with the input values used to generate each <outputInstance> resource at 2910. For example, the SCL may compare the inputs 2810 used to generate <outputInstance> 2708 to determine if the <outputInstance> 2708 can be used rather than invoking the <function> with the input parameters passed by the issuer 2904. If the SCL 2902 finds a match, the corresponding <outputInstance> 2708 is used to service the request rather than the SCL 2902 having to invoke the <function> at 2912. Otherwise, if a match is not found, the SCL 2902 invokes the function to generate a new output using the input parameters passed by the issuer 2904 at 2914. The method 2900 may continue with preparing a response message at 2916. The SCL 2902 may prepare a response message. The method 2900 may continue with the SCL 2902 sending a response at 2918. In some embodiments, the SCL 2902 may invalidate cached <outputInstance> if the content within the SCL that was used to generate the <outputInstance> was deleted or modified. In some embodiments, the SCL 2902 may not cache the <outputInstances> 2708 or may periodically delete <outputInstances> 2708.

In some embodiments, a SCL caching mechanism is provided as part of the defined <function> resource. By maintaining copies of the input parameters within the inputs attribute 2810 of each corresponding <outputInstance> resource 2708, the SCL can support an optimized caching scheme. Since the output of a <function> is dependent on the input, the <outputInstance> 2708 can be used to service future requests having the same input parameters. This optimizes the SCL, since it does not have to repeat execution of the function if an <outputInstance> 2708 resource having the same input parameters is already cached. A function may not have any input in which case a cached <outputInstance> 2708 may even be more valuable since it can be used to service a greater number of future requests to the function. The attribute nrOfHits 2812 may record the number of times that the <outputInstance> 2708 has been used to reply to requests to the function without having to execute the function (i.e. the number of cache hits). This information may be used when the number of <outputInstance> 2708 reaches the designated maxNrOfInstances 2712 and a <outputInstance> 2708 needs to be replaced with a new one. The nrOfHits 2812 can be used as the replacement metric. In some embodiments, the SCL is in charge of managing the outputInstances collection, the only operation allowed from the issuer's perspective is a RETRIEVE.

Figure 30:
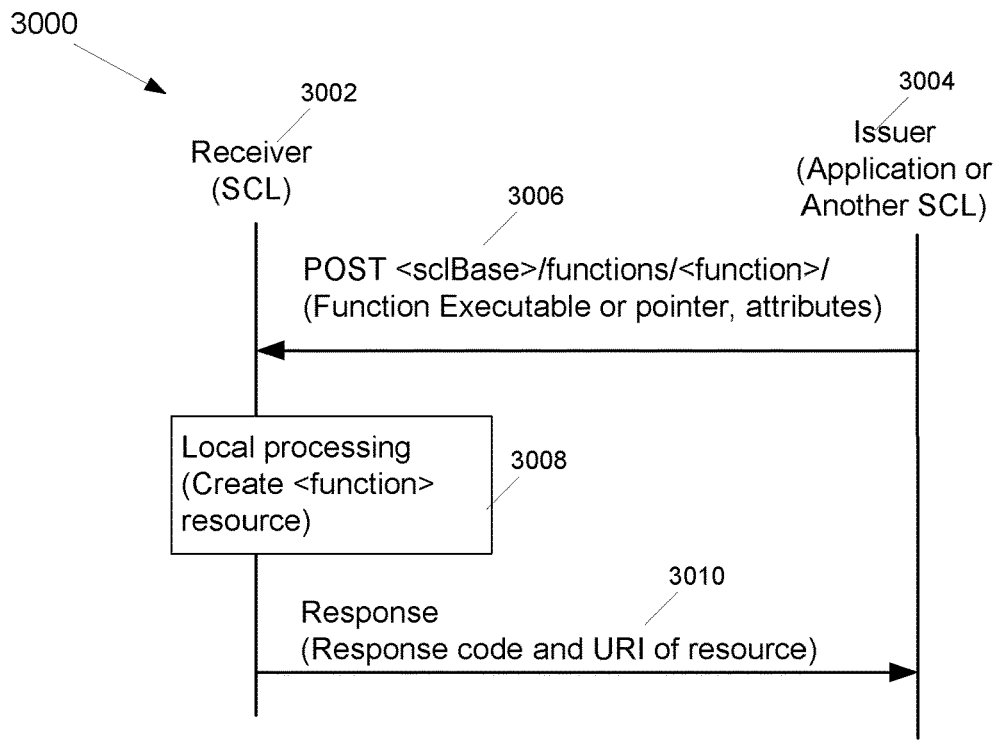
FIG. 30 illustrates a method of creating a <function> resource.

FIG. 30 illustrates a method of creating a <function> resource. The method 3000 may be a CREATE method 3000 that may create a <function> resource within an SCL 3002. The method 3000 may begin with another SCL or an application 3004 sending a POST to the SCL 3002 at 3006. In some embodiments, the POST request includes the following an executable of the <function> or a pointer to an executable of the <function>. If the POST request includes a pointer, this pointer can reference a <function> that is hosted in the SCL such as a native SCL function, or a <function> executable stored within a SCL container or hosted in a remote SCL or application. In some embodiments, the POST request includes declarations for input parameters using mechanisms such as described herein or in a M2M specification such as the ETSI M2M specification. In some embodiments, the POST request includes declarations for outputs using mechanisms such as described herein or in a M2M specification such as the ETSI M2M specification. In some embodiments, the POST request includes other attributes such as a description of the <function>, and a list of URIs to which the created <function> will be announced to. The SCL 3002 may perform local processing to CREATE <function> resource at 3008.

In some embodiments, the SCL 3002 will only allow the POST request if the issuer 3004 is authorized. If the request includes an executable of the function, then the SCL 3002 may store it in some internal memory location and initializes the pointer attribute of the <function> resource to the starting address of the executable's memory location. If the request includes a pointer to a function, then the SCL 3002 may initialize the pointer attribute of the <function> resource to this pointer value. In addition to creating the <function> resource, the SCL 3002 may create the sub-resources of the <function> such as the attributes, inputTypes, and outputTypes. The RESPONSE may include a response code indicating the status of the POST and the URI of the created <function> resource at 3010.

Figure 31:
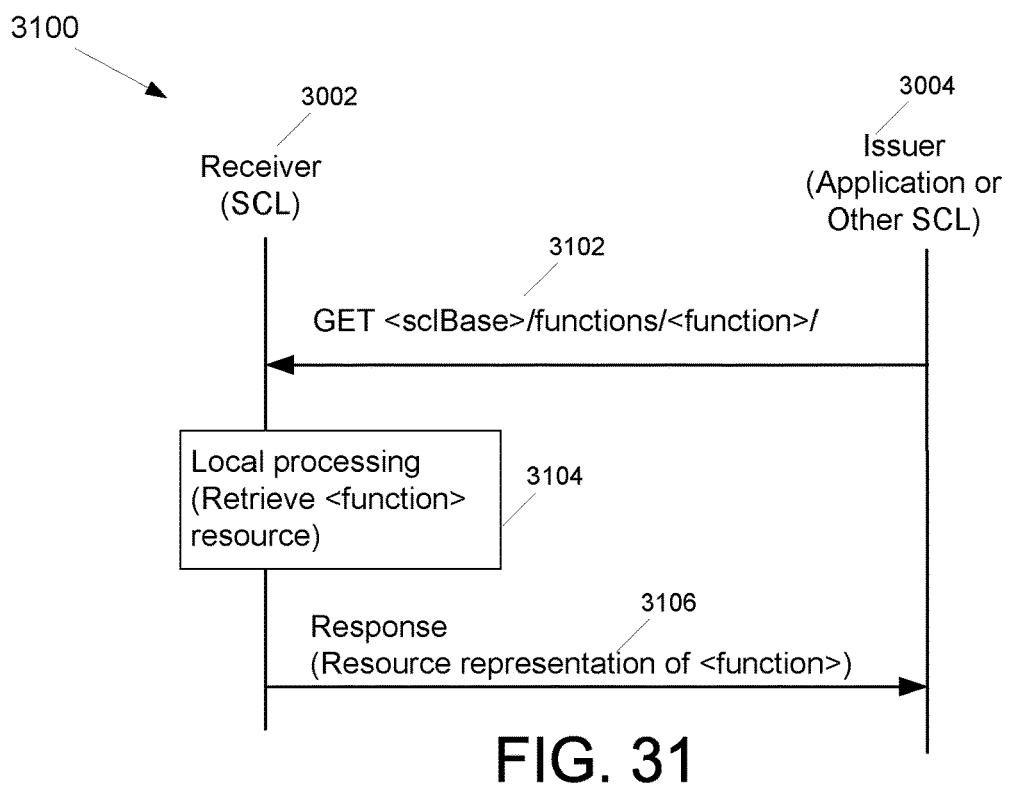
FIG. 31 illustrates a <function> resource RETRIEVE method according to some embodiments.

FIG. 31 illustrates a <function> resource RETRIEVE method according to some embodiments. The method 3100 may begin with an issuer 3004 sending a GET at 3102. The SCL 3002 may perform local processing to retrieve information regarding a <function> resource received in the GET in resource tree <sclBase> at 3104. The method 3100 may continue with a response which may include the <function> containing attribute values and URIs of sub-resources at 3108. Subsequent RETRIEVE requests can be made to the sub-resources to perform further discovery such as discovery of input parameter types and output parameters. In some embodiments, the RETRIEVE method 3100 may be used to discover information about a <function> such as the function type as well as the type of inputs and outputs the function supports.

Figure 32:
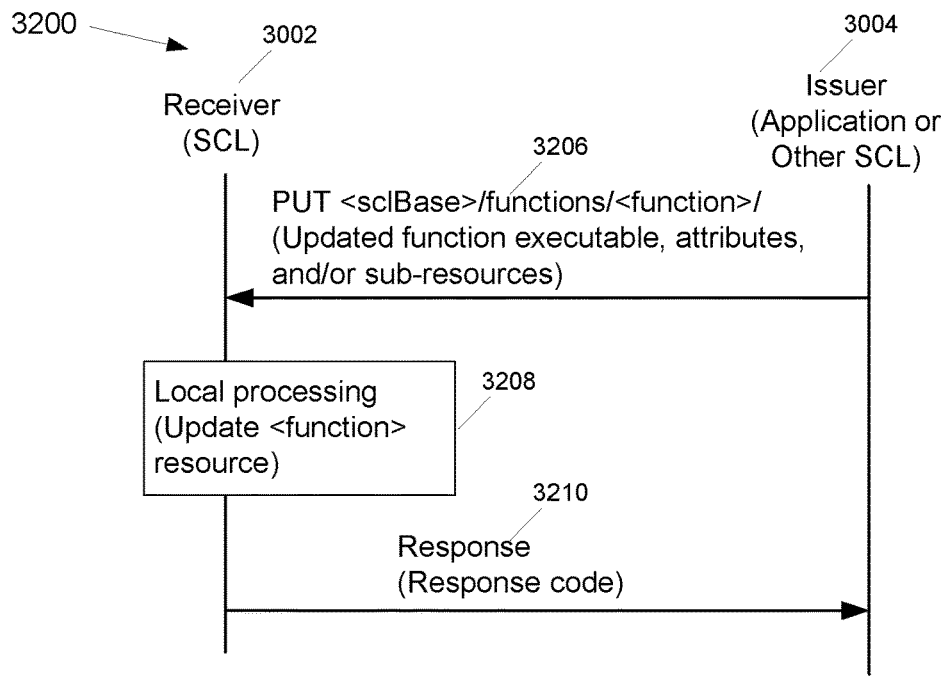
FIG. 32 illustrates an UPDATE <function> request method according to some embodiments.

FIG. 32 illustrates an UPDATE <function> request method according to some embodiment. In some embodiments, the update method 3200 is used to modify the executable and/or the attributes and sub-resources of a <function>. The issuer 3004 may send a PUT to the SCL 3002 at 3206. The SCL 3002 may reject the PUT if the issuer 3004 is not authorized to modify the <function> resource based on the access rights defined for the <function>. The method 3200 may continue with the SCL 3002 performing local processing to update <function> resource at 3208. If the SCL 3002 modifies the <function>, including the update to the sub-resources (inputTypes, outputTypes), the SCL 3002 may perform the following actions. The SCL 3002 may update the executable and pointer attribute of the <function> if necessary. The SCL 3002 may update the <function> attributes if necessary. The SCL 3002 may invalidate the <outputInstance> resources if they are no longer valid and useful since they are based on the execution of the pre-modified <function>. In some embodiments, the instances in the outputInstances collection may be deleted from the resource tree by the SCL 3002.

Figure 33:
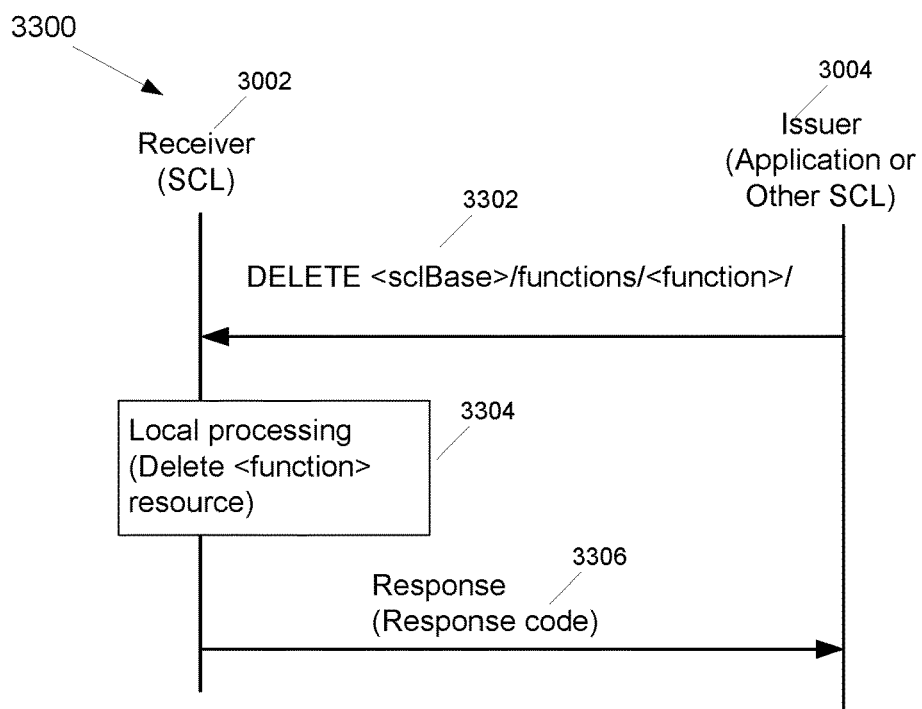
FIG. 33 illustrates a delete <function> request method according to some embodiments.

FIG. 33 illustrates a delete <function> request method according to some embodiment. In some embodiments, the DELETE method 3300 is used to delete a specific <function> resource. The method 3300 may begin with the issuer 3004 sending a DELETE request 3302 to the SCL 3002. In some embodiments, the SCL 3002 may reject the request if the issuer 3004 is not authorized to delete the <function> resource, according to the access rights defined for the <function> resource where the request is targeted. The method 3300 may continue with the SCL 3002 performing local processing to delete the <function> at 3304. The SCL 3002 may successfully delete the <function> resource in the resource tree <sclBase>. In some embodiments, internal storage that was used to store the executable is freed up. The method 3300 continues with the SCL 3002 sending a response to the issuer 3004 at 3306. The response code may indicate whether or not the <function> was successfully deleted.

Figure 34:
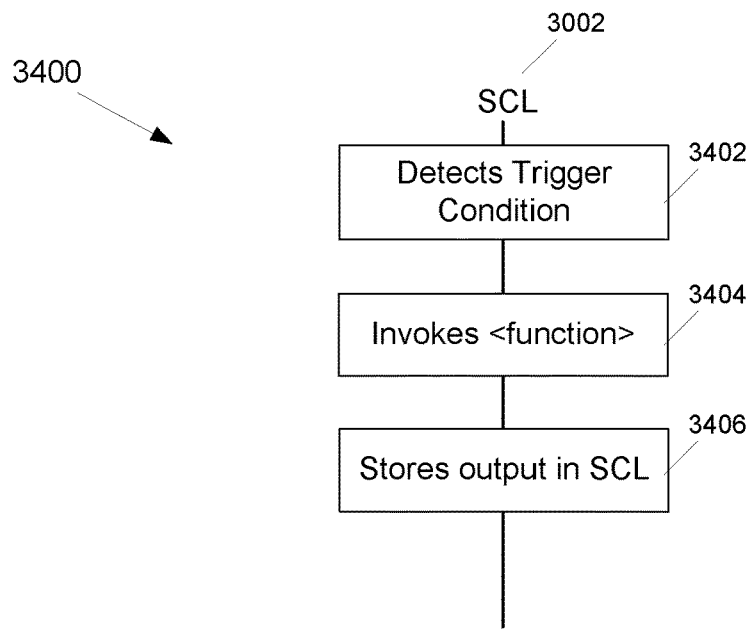
FIG. 34 illustrates a method for initiating the execution of a <function>.

FIG. 34 illustrates a method for initiating the execution of a <function>. In some embodiments, an SCL executes a <function> without being invoked by an application or another SCL. The method 3400 may begin with the SCL 3002 detecting the occurrence of a trigger event matching a triggerCriteria attribute in the <function> resource at 3402. For example, a <function> residing under a contentInstances collection may have a triggerCriteria that specifies the <function> should be triggered by the SCL 3002 each time a new <contentInstance> resource is added to the contentInstances collection. The method 3400 may continue with the SCL 3002 invoking the <function> at 3404. The method 3400 may continue where the SCL 3002 stores the output of the <function> at 3406.

Figure 35:
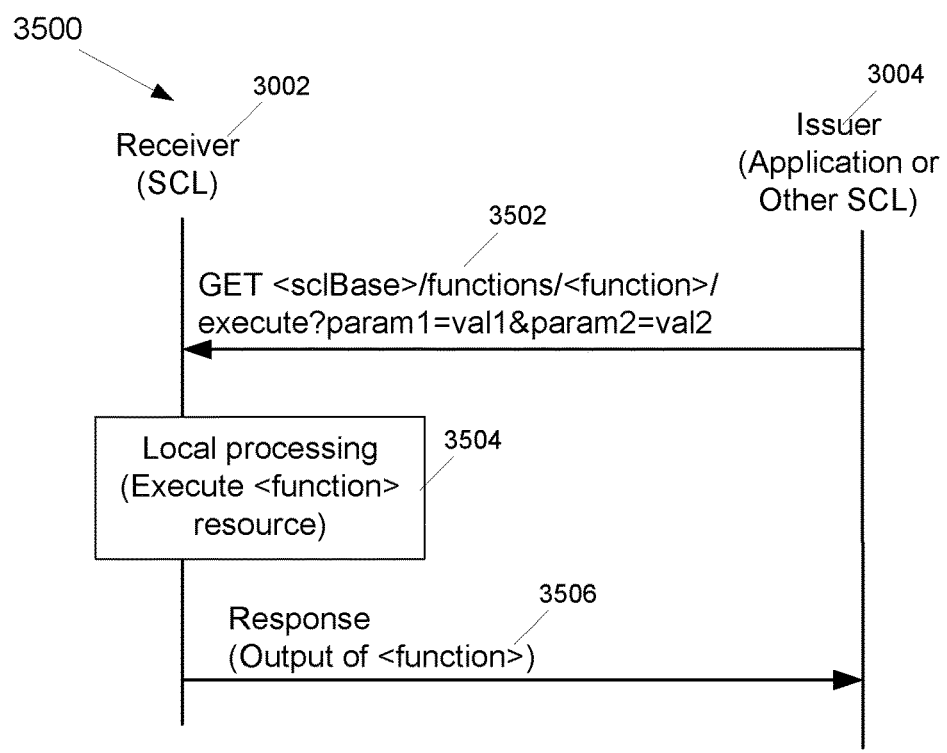
FIG. 35 illustrates a method of invoking a <function> RESTfully by an application or another SCL.

FIG. 35 illustrates a method of invoking a <function> RESTfully by an application or another SCL. In some embodiments, an SCL 3002 executes a <function> when the <function> is RESTfully invoked by an issuing application or another SCL 3004.

The method 3500 may begin with an issuer 3004 making a RESTful request 3502 to the execute attribute of the <function> resource. The RESTful request 3502 may include input parameters passed either by value or by reference. The input parameters may be passed RESTfully in the RESTful request 3502. In some embodiments, the inputs are passed by value in the M2M payload of the request as name/value pairs. In some embodiments, the inputs are passed by value in the URI of the request as name/value pairs. In some embodiments, the inputs are passed by reference in the payload of the request as name/URI pairs. In some embodiments, the inputs are passed by reference in the URI of the request as name/URI pairs. Parameters passed by value may include name/value pairs such as min=3 or max=10. Parameters passed by reference may include name/URI pairs where the URI is a link to where the value is available such as min=<sclBase>/app1/containers/<c1>/contentInstances/<ci1>/content. The method 3500 may continue with the SCL 3002 executing the <function> at 3504. The SCL 3002 may retrieve the values of any input parameters passed by reference prior to executing the <function>. The method 3500 may continue with the SCL 3002 sending a response to the issuer 3004 at 3506. In embodiments, a PUT or POST request may be used to execute the <function>.

After executing a <function>, the output of the function may be made RESTfully available to applications and other SCLs 3004. In some embodiments, when an SCL 3002 executes a <function> autonomously, the SCL 3002 may store the response in the SCL 3002 and make it discoverable to applications and other SCLs 3004. For example, the output can be stored in a contentInstance resource. In some embodiments, the SCL 3002 may send a notification to any applications or remote SCLs 3004 which previously subscribed to receiving notifications for the function after executing the function.

When an SCL 3002 executes a <function> which was RESTfully invoked by an application or another SCL 3004, the SCL 3002 may not store the response in the SCL 3002 but may pass the output by value in the response payload that is returned to the issuer 3004. In some embodiments, an SCL 3002 stores the response in the SCL 3002, for example in a <outputInstance> resource, and passes the output in the response payload returned to the issuer either by value or by reference.

In some embodiments, a mathematical model for functions to provide context-aware services may be used. In some embodiments, a general mathematical model for function formulation to provide context-aware services may be used. In some embodiments, this model can be applied to the functions resource disclosed above. In some embodiments, this model can be adopted as an optimization model to achieve the best objective. In some embodiments, a context-aware service may be described by three variables: a control variable denoted by u that a service provider has control over; a utility parameter denoted by v that a service provider has no control but affects the utility of the service; and, a context variable denoted by c that is related to the utility and that the service provider can observe. In some embodiments, an application or an SCL provide a context-aware service in such a way that a certain objective $f(u,v)$ is optimized with u being the optimization variables. In some embodiments, the maximum value of $f(u,v)$ is desired for different values of u.

Equation (1): maximize $f(u,v)$ for different values of u. In some embodiments, the service provider has no control over the utility parameter v. In some practical situations the utility parameter v is random. If this is the case, the service provider may desire to maximize $f(u,v)$ for different values of u. Equation (2): maximize $E(f(u,v))$ for different values of u.

In addition, the utility parameter v may not be readily observable. In embodiments, a service provider may infer the value of v by observing a context variable c. In some embodiments, the value of c is related to the value of v. If the relationship between the context variable c and the utility parameter v is known by the service provider, the service provider may maximize:

Equation (3): maximize $E(f(u,v), c)$ for different values of u. In some embodiments, v may not be precisely known by the service provider, but the context c may be observed can be related to v in many ways. For example the provider may be able to infer, from use history or general statistics about human behavior in a probabilistic manner the value of v from the value of c. The service provider may determine the probabilities by various means. Even with crude estimates between the value of c and the value v, the value of v may be improved, and thus the utility of the service provider improved. In some embodiments, context variable c is diversified and personal. In some embodiments, the context variable c has different levels of correlation to the utility parameter v. In some embodiments, the context-aware service is one where the service provider has easy access to the context variable c. In some embodiments, the context variable c is strongly related to the utility parameter v. For example, context variable c and utility parameter v may be the same or derived from one another.

In some embodiments, the SCL or an application applies one or more of equation (1), (2), or (3) to observable variables to improve the value of the utility variable v. The SCL or an application is providing a context-aware service by using one or more of u or c to improve a utility variable v. The context-aware service may be part of an M2M architecture. In some embodiments, the context-aware service may be part of a ETSI M2M architecture. In some embodiments, functions may be provided by the ASL that examine data from devices and apply one of the equations by changing an actuator value of device and then using the data of the device as feedback.

Figure 36:
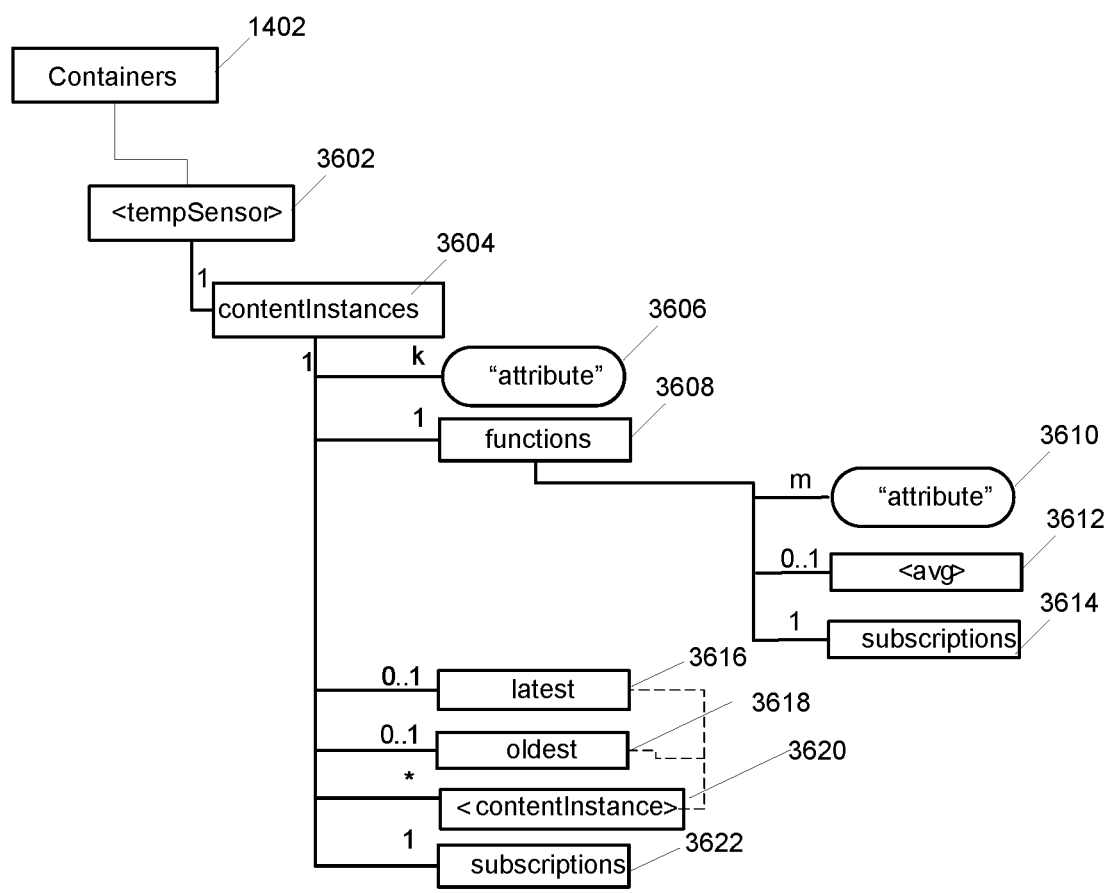
FIG. 36 illustrates an example according to some embodiments.
Figure 37:
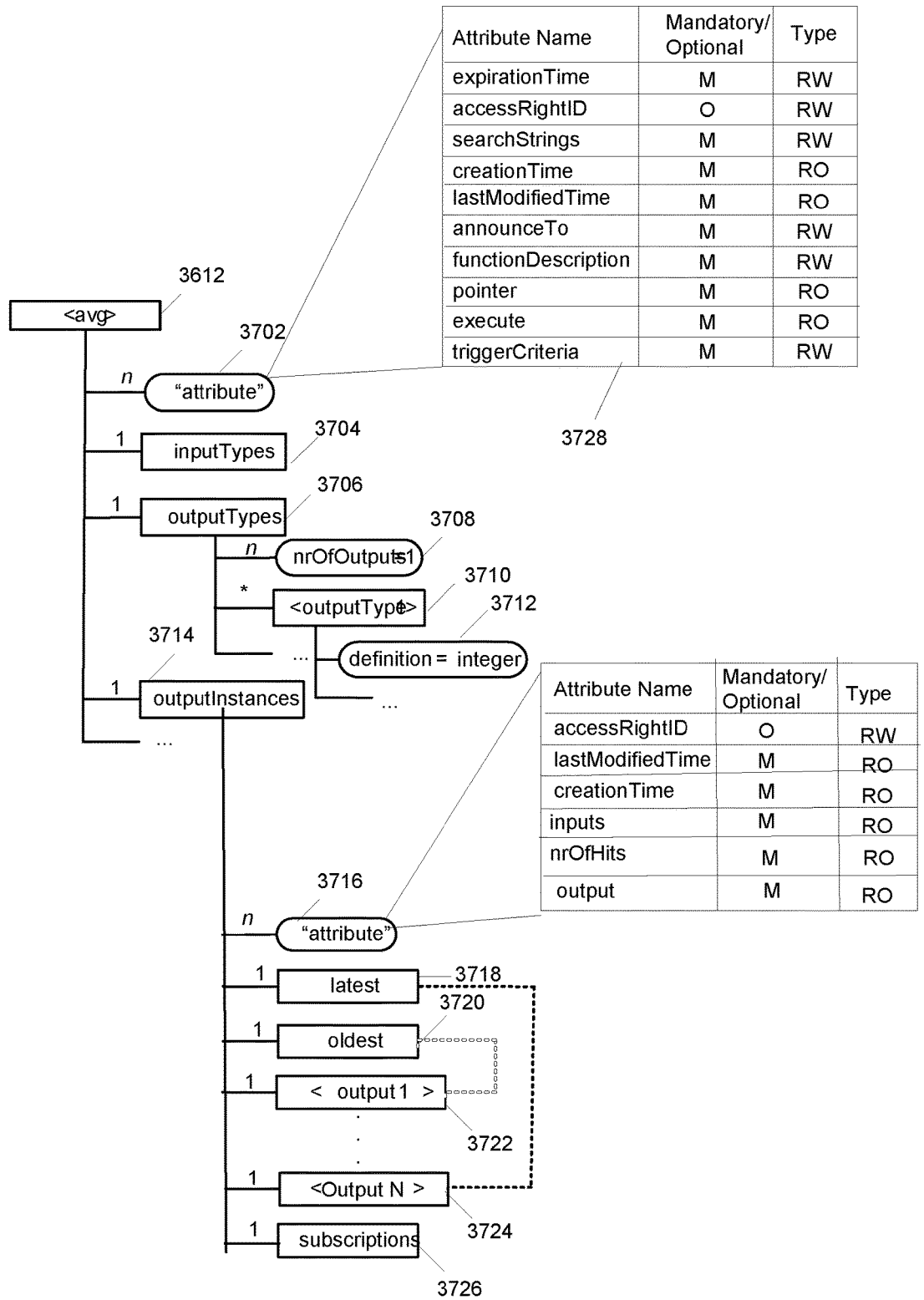
FIG. 37 illustrates an example of a function and output type and output instances according to some embodiments.

FIG. 36 illustrates an example according to some embodiments. FIG. 37 illustrates an example of a function and output type and output instances according to some embodiments. FIGS. 36 and 37 will be described together. An SCL has a container 1402 with a container resource called <tempSensor1> 3602 in which temperature readings from a temperature sensor (not illustrated) are periodically stored as <contentInstance> 3620 sub-resources in the container.

Illustrated in FIG. 36 is containers 1402 and <tempSensor1> 3602. In some embodiments, <tempSensor1> 3602 is an instance of a container resource named <tempSensor1> 3602. The container resource <tempSensor1> 3602 includes contentInstances 3604, which may include attribute 3606, functions 3608, latest 3616, oldest 3618, <contentInstance> 3620, and subscriptions 3622.

Attribute 3608 may be attributes associated with the contentInstances 3604. Latest 3616 may be the latest value added to <tempSensor1> 3602. Oldest 3618 may be the oldest value added to <tempSensor1> 3602. <contentInstance> 3620 may contain zero or more values of <tempSensor1> 3602. Subscriptions 3622 may be programs that are subscribed to receive notification related to <tempSensor1> 3602. The functions 3608 may include attributes 3610, <avg> 3612, and subscriptions 3614. The attributes 3610 may be attributes related to functions 3608. The subscriptions 3614 may be subscriptions related to the functions 3608. <avg> 3612 may be a instance of a function 3608 and is described in conjunction with FIG. 37. The functions 3608 may be functions that operate on contentInstances 3604 or on values passed to the functions 3604. The functions 3604 may provide content aware services and context aware services.

The content within each <contentInstance> 3620 is of type of integer, which may be a basic data type natively supported by the SCL. The SCL natively supports a function called <avg> 3612 that computes the average value across all <contentInstance> 3620 resources in the container <tempSensor1> 3602. The function <avg> 3612 does not have any inputs so inputTypes 3704 is empty. The function <avg> 3612 generates an output stored in ouputInstances 3714 of type <outputType1>, which is defined as an integer 3712. The function <avg> 3612 is configured with a triggerCriteria 3728 which results in the SCL invoking the function <avg> 3612 each time a new resource <contentInstance> 3620 is created in the container <tempSensor1> 3602. The output of each function <avg> 3612 invocation may be stored by the SCL in a new resource <outputN> 3724 within the collection outputInstances 3714 of the function <avg> 3612. In some embodiments, the SCL may cache the results of the function <avg> 3612. By storing previous results of the function <avg> 3612, the SCL maintains a history of average values computed by the function <avg> 3612. Applications, other SCLs, and the SCL can retrieve the stored average values 3722, 3724, and can retrieve the last computed average value stored at latest 3718 of the outputInstances 3714. Alternatively or in addition, an application or other SCL can create a subscription 3726 to function <avg> 3612 to receive a notification from the SCL each time the average changes or each time the average is computed by the function <avg> 3612. The example illustrated in FIG. 36 may be used to provide numerical content or context based services in an ETSI M2M.

A growing trend in the standardization of communication network technologies is standardization of the ASL. By standardizing the ASL for a particular networking technology, many of the same benefits that have been realized by standardizing lower level protocol layers can also be realized for the ASL. Via a standardized ASL, applications compliant with the same ASL have a higher probability of interoperating with one another in a more reliable manner.

In some embodiments, a context aware function may be configured to generate high-level situational context such as detecting a heat wave in a particular city or region (e.g. five consecutive days where max temperature exceeds 90 degrees Fahrenheit).

In some embodiments, a function may be a routine, subroutine, software module, or portions of computer code that performs the disclosed function, method, or algorithm. Further, the steps and/or actions of a function, method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative or additionally, the storage medium may be integral to the processor. Further, in some aspects, the processor and the storage medium may reside in an ASIC. Additionally, the ASIC may reside in a user terminal. In the alternative or additionally, the processor and the storage medium may reside as discrete components in a user terminal. Additionally or in addition, in some aspects, the steps and/or actions of a method or algorithm may reside as one or any combination or set of instructions on a machine readable medium and/or computer readable medium.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). In some embodiments, the computer-readable storage media is non-transitory. A processor in association with software may be used to implement a radio frequency transceiver for use in a WTRU, UE, terminal, base station, RNC, or any host computer.

What is claimed is:

1. A machine-to-machine (M2M) gateway configured with a service capability layer (SCL) that improves the performance of an M2M system, the M2M gateway comprising:
   a storage unit that stores a plurality of rules for allocating a plurality of resources in a resource tree, the plurality of resources comprising a functions collection resource that includes a plurality of function sub-resources, at least one of the function sub-resources representing a context aware reasoning function configured to generate contextual cues from content and a semantic description of the content;
   a network interface that is communicatively coupled to one or more M2M unit; and
   a processor communicatively coupled to the storage unit and the network interface;
   wherein the processor is configured to:
      receive, using the network interface, from a first application or a second SCL, a first request to create a new function sub-resource in the collection, the new function sub-resource representing a new context aware reasoning function,
      create the new function sub-resource in the resource tree in response to the first request,
      receive, using the network interface, a second request from a second application or a third SCL, the second request targeting the new function sub-resource and including content data and an associated semantic description of the content data, generate high-level contextual information, using the new context aware reasoning function, based on the received content data and the associated semantic description of the content data, and
route data in the M2M network based on the generated high-level contextual information to improve utilization of the M2M network.

2. The M2M gateway of claim 1, wherein the collection of context aware reasoning sub-resources represents functions hosted locally at the M2M gateway.

3. The M2M gateway of claim 1, wherein the collection of context aware reasoning sub-resources represents functions hosted on a device that is remote from the M2M gateway.

4. The M2M gateway of claim 1, wherein the first and second application and the second and third SCL are provided on other M2M devices.

5. The M2M gateway of claim 1, wherein the new function sub-resource includes information for the corresponding context aware reasoning function, the information including at least one of a function description providing information describing the corresponding context aware reasoning function, a pointer to a memory address location for the start of the function implementation, execute information, using RESTful commands, to invoke the corresponding context aware reasoning function, an expiration time, an access right ID, search strings providing information describing the corresponding context aware reasoning function, a creation time, announce to information, and trigger criteria for the function that provides information regarding conditions under which the SCL is to autonomously invoke the corresponding context aware reasoning function.

6. The M2M gateway of claim 5, the interface and the processor further configured to:
perform an operation specified by the trigger criteria on a condition that the trigger criteria is detected, and
store high-level context information produced as a result of invoking the corresponding context aware reasoning function in the storage device at the M2M gateway.

7. The M2M gateway of claim 1, the interface and the processor further configured to:
receive a third request from the third SCL or the second application to subscribe to the collection, and
send a notification to the third SCL or to the second application on a condition that the new function resource is added to the collection.

8. A method, executed in a machine-to-machine (M2M) gateway configured with a service capability layer (SCL), for improving the performance of an M2M system, the method comprising:
receiving, using a network interface that is communicatively coupled to one or more M2M unit, from a first application or a second SCL, a first request to create a new function sub-resource in a functions collection resource, the functions collection resource comprising a plurality of function sub-resources, at least one of the function sub-resources representing a context aware reasoning function configured to generate contextual cues from content and a semantic description of the content, and the new function sub-resource representing a new context aware reasoning function;
creating the new function sub-resource in a resource tree in response to the first request;
receiving, using the network interface, a second request from a second application or a third SCL, the second request targeting the new function sub-resource and including content data and an associated semantic description of the content data;
generating high-level contextual information, using the new context aware reasoning function, based on the received content data and the associated semantic description of the content data; and
routing data in the M2M network based on the generated high-level contextual information to improve utilization of the M2M network.

9. The method of claim 8, wherein the collection of context aware reasoning sub-resources represents functions hosted locally at the M2M gateway.

10. The method of claim 8, wherein the collection of context aware reasoning sub-resources represents functions hosted on a device that is remote from the M2M gateway.

11. The method of claim 8, wherein the first and second application and the second and third SCL are provided on other M2M devices.

12. The method of claim 8, wherein the new function sub-resource includes information for the corresponding context aware reasoning function, the information including at least one of a function description providing information describing the corresponding context aware reasoning function, a pointer to a memory address location for the start of the function implementation, execute information, using RESTful commands, to invoke the corresponding context aware reasoning function, an expiration time, an access right ID, search strings providing information describing the corresponding context aware reasoning function, a creation time, announce to information, and trigger criteria for the function that provides information regarding conditions under which the SCL is to autonomously invoke the corresponding context aware reasoning function.

13. The method of claim 12, further comprising:
performing an operation specified by the trigger criteria on a condition that the trigger criteria is detected; and
storing high-level context information produced as a result of invoking the corresponding context aware reasoning function in the storage device at the M2M gateway.

14. The method of claim 8, further comprising:
receiving a third request from the third SCL or the second application to subscribe to the collection; and
sending a notification to the third SCL or to the second application on a condition that the new function resource is added to the collection.

15. A machine-to-machine (M2M) system comprising:
a plurality of M2M devices, each independently configured with at least one of a services capability layer (SCL) and an application;
an M2M gateway configured with an SCL, the M2M gateway comprising:
a storage unit that stores a plurality of rules for allocating a plurality of resources in a resource tree, the plurality of resources comprising a functions collection resource that includes a plurality of function sub-resources, at least one of the function sub-resources representing a context aware reasoning function configured to generate contextual cues from content and a semantic description of the content,
a network interface that is communicatively coupled to one or more M2M unit, and
a processor communicatively coupled to the storage unit and the network interface, wherein the processor is configured to:
receive, using the network interface, from a first application or a second SCL, a first request to create a new function sub-resource in the collection, the new function sub-resource representing a new context aware reasoning function,
create the new function sub-resource in the resource tree in response to the first request,
receive, using the network interface, a second request from a second application or a third SCL, the second request targeting the new function sub-resource and including content data and an associated semantic description of the content data,
generate high-level contextual information, using the new context aware reasoning function, based on the received content data and the associated semantic description of the content data, and
route data in the M2M network based on the generated high-level contextual information to improve utilization of the M2M network; and
an M2M server configured to store content data and corresponding high-level contextual information from the plurality of M2M devices.

16. The M2M system of claim 15, wherein the plurality of M2M devices includes at least one of sensors, meters and other gateways.

17. The M2M system of claim 15, wherein the collection of context aware reasoning sub-resources represents at least one of functions hosted locally at the M2M gateway and functions hosted at another one of the plurality of M2M devices or at the M2M server.

18. The M2M system of claim 15, wherein the new function sub-resource includes information for the corresponding context aware reasoning function, the information including at least one of a function description providing information describing the corresponding context aware reasoning function, a pointer to a memory address location for the start of the function implementation, execute information, using RESTful commands, to invoke the corresponding context aware reasoning function, an expiration time, an access right ID, search strings providing information describing the corresponding context aware reasoning function, a creation time, announce to information, and trigger criteria for the function that provides information regarding conditions under which the SCL is to autonomously invoke the corresponding context aware reasoning function.

19. The M2M system of claim 18, wherein the M2M gateway is further configured to perform an operation specified by the trigger criteria on a condition that the trigger condition is detected and store higher-level context information produced as a result of the function execution in the storage device at the M2M gateway.

20. The M2M system of claim 15, wherein the M2M gateway is further configured to receive a request from the SCL at the second M2M device or the second application to subscribe to the collection and send a notification to the SCL at the second M2M device or to the second application when the new context aware reasoning function is added to the collection.

* * * * *